US012809858B2

(12) United States Patent
Liang et al.

(10) Patent No.: US 12,809,858 B2
(45) Date of Patent: Nov. 24, 2026

(54) SYSTEMS AND METHODS FOR LARGE LANGUAGE MODEL REASONING

(71) Applicant: Salesforce, Inc., San Francisco, CA (US)

(72) Inventors: Zhenwen Liang, Fremont, CA (US); Ye Liu, Fremont, CA (US); Tong Niu, Sunnyvale, CA (US); Yingbo Zhou, Palo Alto, CA (US); Semih Yavuz, Redwood City, CA (US)

(73) Assignee: Salesforce, Inc., San Francisco, CA (US)

( * ) Notice: Subject to any disclaimer, the term of this patent is extended or adjusted under 35 U.S.C. 154(b) by 49 days.

(21) Appl. No.: 18/974,227

(22) Filed: Dec. 9, 2024

(65) Prior Publication Data

US 2026/0044496 A1 Feb. 12, 2026

Related U.S. Application Data

(60) Provisional application No. 63/681,636, filed on Aug. 9, 2024.

(51) Int. Cl.
*G06F 16/24* (2019.01)
*G06F 16/242* (2019.01)
(Continued)

(52) U.S. Cl.
CPC ...... *G06F 16/243* (2019.01); *G06F 16/24578* (2019.01); *G06N 3/045* (2023.01); *G06N 3/0985* (2023.01)

(58) Field of Classification Search
None
See application file for complete search history.

(56) References Cited

U.S. PATENT DOCUMENTS

2011/0131045 A1* 6/2011 Cristo ................. G06F 16/3329 704/E15.005
2024/0347058 A1* 10/2024 Rossi ...................... G10L 13/08
(Continued)

OTHER PUBLICATIONS

Qin et al. Large Language Models are Effective Text Rankers with Pairwise Ranking Prompting. arXiv:2306.17563v2, Mar. 2024. (Year: 2024).*
(Continued)

*Primary Examiner* — Cindy Nguyen
(74) *Attorney, Agent, or Firm* — Haynes and Boone, LLP

(57) ABSTRACT

A method for building an artificial intelligence (AI) agent. The method includes: receiving a training query; generating, by a first neural network based language model, a training dataset comprising a correct solution and an incorrect solution to the training query; generating, by a second neural network based language model, a first candidate score in response to the correct solution and a second candidate score in response to the incorrect solution; and training the second neural network based language model, based on a training objective. The method also includes building, at a server, an AI agent through a first application programming interface (API) to a third neural network based language model configured to generate a plurality of candidate solutions in response to the user utterance, and through a second API to the trained second neural network based language model configured to generate scores conditioned on the plurality of candidate solutions; ranking.

20 Claims, 16 Drawing Sheets

(51) Int. Cl.

| | |
|---|---|
| ***G06F 16/2457*** | (2019.01) |
| ***G06N 3/045*** | (2023.01) |
| ***G06N 3/0985*** | (2023.01) |

(56) References Cited

U.S. PATENT DOCUMENTS

| | | | | |
|---|---|---|---|---|
| 2025/0335929 | A1* | 10/2025 | Carey | G06Q 30/016 |
| 2025/0355912 | A1* | 11/2025 | Gupta | G06F 16/24578 |

OTHER PUBLICATIONS

Chen et al. Program of Thoughts Prompting: Disentangling Computation from Reasoning for Numerical Reasoning Tasks. arXiv: 2211.12588v4, Oct. 2023. (Year: 2023).*

VanHook. Automatically detect and block low-volume network floods. AWS Security Blog, 2023. https://aws.amazon.com/blogs/security/automatically-detect-and-block-low-volume-network-floods/ (Year: 2023).*

Li et al. TrainerAgent: Customizable and Efficient Model Training through LLM-Powered Multi-Agent System. arXiv:2311.06622v2, Nov. 2023. (Year: 2023).*

* cited by examiner

| | Sampling + CoTnPoT | Voting + CoTnPoT | Recall + CoTnPoT | SimPO | SimPO + CoTnPoT | Weighted Voting + CoTnPoT |
|---|---|---|---|---|---|---|
| **GSM8k:** | | | | | | |
| LLaMA2-7B-GSM8k | 56.56 | 67.25 | 88.48 | 75.21 | 78.01 | 78.09 |
| | ↑ ***40.77%*** | ↑ ***24.93%*** | ↓ ***4.11%*** | 0% | ↑ ***3.72%*** | ↑ ***3.66%*** |
| | ↑ *40.77%* | ↑ *67.37%* | ↑ *120.21%* | ↑ *87.18%* | ↑ *94.15%* | ↑ *94.35%* |
| Mistral-7B-GSM8k | 71.34 | 84.76 | 96.66 | 87.87 | 89.54 | 89.69 |
| | ↑ ***27.85%*** | ↑ ***10.80%*** | ↓ ***1.85%*** | 0% | ↑ ***1.90%*** | ↑ ***1.94%*** |
| | ↑ *27.85%* | ↑ *51.90%* | ↑ *73.23%* | ↑ *57.47%* | ↑ *60.47%* | ↑ *60.73%* |
| Gemma-7B-it | 66.79 | 71.11 | 83.62 | 75.06 | 78.54 | 78.54 |
| | ↑ ***26.57%*** | ↑ ***23.41%*** | ↓ ***2.22%*** | 0% | ↑ ***4.64%*** | ↑ ***4.58%*** |
| | ↑ *26.57%* | ↑ *34.75%* | ↑ *58.46%* | ↑ *42.24%* | ↑ *48.83%* | ↑ *48.83%* |
| InternLM2-Math-7B | 88.40 | 91.21 | 97.42 | 92.34 | 92.49 | 92.65 |
| | ↑ ***4.76%*** | ↑ ***2.39%*** | ↓ ***0.93%*** | 0% | ↑ ***0.16%*** | ↑ ***0.23%*** |
| | ↑ *4.76%* | ↑ *8.09%* | ↑ *15.45%* | ↑ *9.43%* | ↑ *9.61%* | ↑ *9.80%* |
| Phi3-14B | 89.99 | 94.19 | 99.01 | 94.16 | 94.47 | 94.62 |
| | ↑ ***3.76%*** | ↑ ***0.67%*** | ↓ ***0.23%*** | 0% | ↑ ***0.33%*** | ↑ ***0.45%*** |
| | ↑ *3.76%* | ↑ *8.60%* | ↑ *14.16%* | ↑ *8.57%* | ↑ *8.92%* | ↑ *9.10%* |
| LLaMA3-70B-instruct | 94.92 | 95.45 | 97.73 | 95.22 | 95.30 | 95.60 |
| | ↑ ***0.56%*** | ↑ ***0.24%*** | ↓ ***0.76%*** | 0% | ↑ ***0.08%*** | ↑ ***0.33%*** |
| | ↑ *0.56%* | ↑ *1.12%* | ↑ *3.54%* | ↑ *0.88%* | ↑ *0.96%* | ↑ *1.28%* |

FIG. 7B-1

| | | | | | | |
|---|---|---|---|---|---|---|
| **MATH500:** | | | | | | |
| LLaMA3-8B-Instruct | 40.20 | 41.60 | 63.60 | 45.00 | 45.80 | 46.00 |
| | ↑ ***34.00%*** | ↑ ***13.04%*** | ↓ **8.88%** | 0% | ↑ ***1.78%*** | ↑ ***1.77%*** |
| | ↑ *34.00%* | ↑ *38.67%* | ↑ *112.00%* | ↑ *50.00%* | ↑ *52.67%* | ↑ *53.33%* |
| Mistral-Instruct-v0.3 | 28.40 | 32.40 | 50.00 | 32.60 | 35.40 | 35.60 |
| | ↑ ***121.87%*** | ↑ ***54.29%*** | ↓ **13.79%** | 0% | ↑ ***8.59%*** | ↑ ***7.88%*** |
| | ↑ *121.87%* | ↑ *153.12%* | ↑ *290.62%* | ↑ *154.69%* | ↑ *176.56%* | ↑ *178.12%* |
| Gemma-7B-it | 33.20 | 35.80 | 51.60 | 32.80 | 39.20 | 39.60 |
| | ↑ ***104.94%*** | ↑ ***50.42%*** | ↓ **9.79%** | 0% | ↑ ***19.51%*** | ↑ ***18.56%*** |
| | ↑ *104.94%* | ↑ *120.99%* | ↑ *218.52%* | ↑ *102.47%* | ↑ *141.98%* | ↑ *144.44%* |
| InternLM2-Math-7B | 58.20 | 63.00 | 76.00 | 62.00 | 63.60 | 63.80 |
| | ↑ ***62.57%*** | ↑ ***12.90%*** | ↓ **2.31%** | 0% | ↑ ***2.58%*** | ↑ ***2.24%*** |
| | ↑ *62.57%* | ↑ *75.98%* | ↑ *112.29%* | ↑ *73.18%* | ↑ *77.65%* | ↑ *78.21%* |
| Phi3-14B | 42.80 | 48.20 | 65.00 | 50.80 | 50.00 | 50.20 |
| | ↑ ***81.36%*** | ↑ ***4.78%*** | ↓ **11.92%** | 0% | ↓ **1.57%** | ↓ **1.18%** |
| | ↑ *81.36%* | ↑ *104.24%* | ↑ *175.42%* | ↑ *115.25%* | ↑ *111.86%* | ↑ *112.71%* |
| LLaMA3-70B-instruct | 56.80 | 61.20 | 76.00 | 56.80 | 60.80 | 62.80 |
| | ↑ ***9.23%*** | ↑ ***3.38%*** | ↓ **12.64%** | 0% | ↑ ***7.04%*** | ↑ ***8.28%*** |
| | ↑ *9.23%* | ↑ *17.69%* | ↑ *46.15%* | ↑ *9.23%* | ↑ *16.92%* | ↑ *20.77%* |

FIG. 7B-2

| | Codegemma | Phi | LLaMA3 | CodeQwen | DeepseekCoder |
|---|---|---|---|---|---|
| MBPP w/o CoTnPoT | 64.2/53.9<br>↓ **8.81%** / ↓ **5.27%** | 72.2/58.3<br>↑ *0.14%* / ↑ *1.04%* | 60.4/51.2<br>↓ **13.84%** / ↓ **13.66%** | 75.7/65.7<br>↓ **4.66%** / ↓ **4.78%** | 72.0/60.8<br>↓ **4.26%** / ↓ **2.25%** |
| MBPP w CoTnPoT | 67.6/55.4<br>↓ **3.98%** / ↓ **2.64%** | 74.9/60.0<br>↑ *3.88%* / ↑ *3.99%* | 66.2/54.8<br>↓ **5.56%** / ↓ **7.59%** | 79.5/69.6<br>↑ *0.13%* / ↑ *0.87%* | 73.9/62.6<br>↓ **1.73%** / ↑ *0.64%* |
| MBPP + MagiCoder w/o CoTnPoT | 65.1/54.8<br>↓ **7.53%** / ↓ **3.69%** | 73.7/58.4<br>↑ *2.22%* / ↑ *1.21%* | 63.3/52.6<br>↓ **9.70%** / ↓ **11.30%** | 77.5/66.5<br>↓ **2.39%** / ↓ **3.62%** | 73.0/62.2<br>↓ **2.93%** / *0.00%* |
| MBPP + MagiCoder w CoTnPoT | 70.9/58.3<br>↑ *0.71%* / ↑ *2.46%* | 75.2/60.5<br>↑ *4.30%* / ↑ *4.85%* | 72.7/62.0<br>↑ *3.71%* / ↑ *4.55%* | 80.3/71.1<br>↑ *1.13%* / ↑ *3.04%* | 77.5/67.3<br>↑ *3.06%* / ↑ *8.20%* |

FIG. 7C

| ***Mistral-7B-MetaMath Results*** | **GSM8k** | **MATH500** |
|---|---|---|
| Major Voting @ 64 | 83.50 | 35.00 |
| Major Voting @ 256 | 83.90 | 35.10 |
| Math-Shepherd @ 256 (Wang et al., 2023) | 87.10 | 37.30 |
| Math-Shepherd + Voting @ 256 (Wang et al., 2023) | 86.30 | 38.30 |
| ORM + PPO + Voting @ 256 (Wang et al., 2023) | 89.00 | 43.10 |
| Math-Shepherd + PPO + Voting @ 256 (Wang et al., 2023) | 89.10 | 43.50 |
| Math-Minos (ORM) @ 256 (Gao et al., 2024) | 87.30 | 37.40 |
| Math-Minos (PRM) @ 256 (Gao et al., 2024) | 87.60 | 37.80 |
| Math-Minos (ORM) + Voting @ 256 (Gao et al., 2024) | 88.20 | 38.30 |
| Math-Minos (PRM) + Voting @ 256 (Gao et al., 2024) | 87.80 | 38.60 |
| Math-Rev (Ours) @ 64 | 90.37 | **46.60** |
| Math-Rev + CoTnPoT (Ours) @ 64 | **90.75** | 46.40 |

FIG. 7D

| | **Actually Positive:** Correct CoT Solution | **Actually Negative:** Wrong CoT Solution |
|---|---|---|
| **Predicted Positive:** CoTnPoT Match | True Positives (TPR): 90.09% | False Positives (FPR): 20.30% |
| **Predicted Negative:** CoTnPoT Mismatch | False Negatives (FNR): 9.91% | True Negatives (TNR): 79.70% |

FIG. 7F

SYSTEMS AND METHODS FOR LARGE LANGUAGE MODEL REASONING

CROSS REFERENCE(S)

The instant application is a nonprovisional of and claim priority under 35 U.S.C. 119 to U.S. provisional application No. 63/681,636, filed Aug. 9, 2024, which is hereby expressly incorporated by reference herein in its entirety.

TECHNICAL FIELD

The embodiments relate generally to machine learning systems for machine reasoning, and more specifically to systems and methods for large language model (LLM) reasoning.

BACKGROUND

AI conversation agents, commonly known as chatbots or virtual assistants, can be applied to a wide range of practical applications across various industries. In customer service, AI agents can handle user inquiries, provide support, and resolve issues 24/7, improving customer satisfaction and reducing operational costs. In healthcare, AI agents can offer initial consultations, answer health-related questions, and remind patients to take their medications. In the e-commerce sector, AI conversation agents can assist with product recommendations, order tracking, and personalized shopping experiences. In information technology (IT) support, these agents can guide users through troubleshooting steps, helping them resolve software and hardware issues. Specifically, for network hazards, AI conversation agents can diagnose connectivity problems, suggest corrective actions, and provide step-by-step guidance to ensure network security and stability. Their versatility and ability to handle diverse tasks make them valuable tools in enhancing efficiency and user experience in various fields.

AI agents often employ a neural network based generative language model to generate an output such as in the form of a text response, or a series actions to complete a complex task, such as to network issue troubleshooting, etc. Such generative language model receives a natural language input in the form of a sequence of tokens, and in turn generates a predicted distribution over a token space conditioned on the input sequence. Generated output tokens over time may in turn form the text response, or actions for completing the task. However, the training and use the verifier LLMs remains challenging.

BRIEF DESCRIPTION OF THE DRAWINGS

FIGS. 7A-7F provide charts illustrating exemplary performance of different embodiments described herein.

Figure 1:
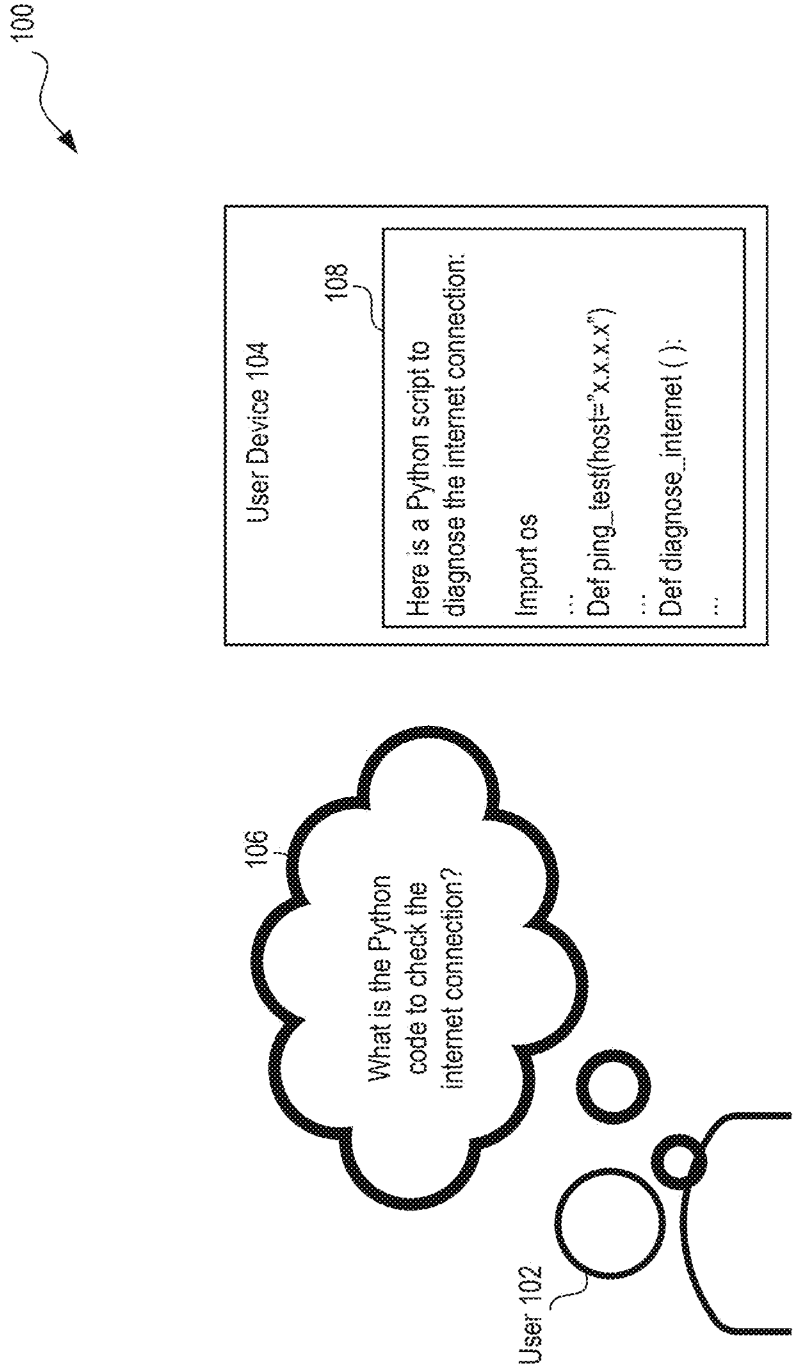
FIG. 1 shows an application of a user device with machine reasoning capabilities, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters. An LLM may comprise an architecture of mixed software and/or hardware, e.g., including an application-specific integrated circuit (ASIC) such as a Tensor Processing Unit (TPU).

As used herein, the term "generative artificial intelligence (AI)" may refer to an AI system that outputs new content that does not pr-exist in the input to such AI system. The new content may include text, images, music, or code. An LLM is an example generative AI model that generate tokens representing new words, sentences, paragraphs, passages, and/or the like that do not pre-exist in an input of tokens to such LLM. For example, when an LLM generate a text answer to an input question, the text answer contains words and/or sentences that are literally different from those in the input question, and/or carry different semantic meaning from the input question.

Overview

Large language models (LLMs) can be used to verify and rank outputs of another LLM. However, the training and use of LLMs for such verification tasks remains challenging because LLMs are hardly trained and/or finetuned for this task due to scarcity of comprehensive training data and limitation of input data during inference stage.

In view of the need for LLMs that can provide verification result of improved accuracy, embodiments described herein provide a systems and methods for a data pipeline framework for training and inferencing an LLM to verify an LLM-generated answer so as to improve accuracy of LLM-generated answers. For example, a verifier LLM receives and generates a score of the output of a reasoner LLM, which generates solutions in response to a question. First, the present disclosure provides a training dataset for training the verifier LLM to more accurately identify correct solutions over incorrect solutions. The training dataset includes a plurality of correct solutions and a plurality of incorrect solutions, and is used to train the verifier LLM to generate a higher probability for a correct (e.g., preferred) solution. Second, the present disclosure also provides a method to process input data of a trained verifier LLM at inference stage. Specifically, the method may integrate language solutions and code solutions for improved verification result. For example, language solutions may be converted to code formats before verification. Code solutions may be fed to the verifier with a corresponding explanation. The verifier LLM may generate scores of the solutions, which are ranked for providing solution with the highest score. The processing of the input data can help the verifier LLM to better understand the question, and select the preferred solution with higher accuracy.

Embodiments described herein provide a number of benefits. For example, LLM reasoning can have improved accuracy due to the improvement in training and utilization of the verifier LLM. Therefore, with improved performance on the verifier LLM, neural network technology in applications that generate solutions to questions (e.g., network diagnostic applications, healthcare applications, code generation applications, mathematical computation applications, etc.) using chatbots based on verifier LLMs is improved.

FIG. 1 shows an application 100 of an LLM based AI conversation agent, according to embodiments of the present disclosure. A user 102 may utter a query 106 in natural language. In response, a user device 104 may output/display an answer 108 on a display interface, such as a screen. In some embodiments, answer 108 is the output of an artificial intelligence (AI) chatbot, which is built on a bot server that is communicatively connected to user device 104. The chatbot may be based on, or include, an LLM. In some embodiments, the LLM receives query 106 through utterance of user 102, which may retrieve a corpus of documents, and generate an output based on the retrieved documents.

As an example, query 106 may include a question of "What is the Python code to check the internet connection?" The chatbot may include the query 106 in a predefined format providing instruction to the LLM how to generate a response to query 106, referred to as a "prompt," which may be fed to an LLM as input. The LLM may in turn provide answer 108, e.g., a result/solution to the question in a predetermined format, e.g., a bullet-point format, such that one type of medical coverage is listed behind a bullet-point. In an example, answer 108 may include a piece of Python code for internet diagnosis generated by the LLM.

The underlying LLM may be implemented at user device 104, or at a remote server which is accessible by the user device 104. The LLM may be trained with a large corpus of texts and/or documents to generate a solution in response to a question as further described in FIG. 2 below.

Figure 2:
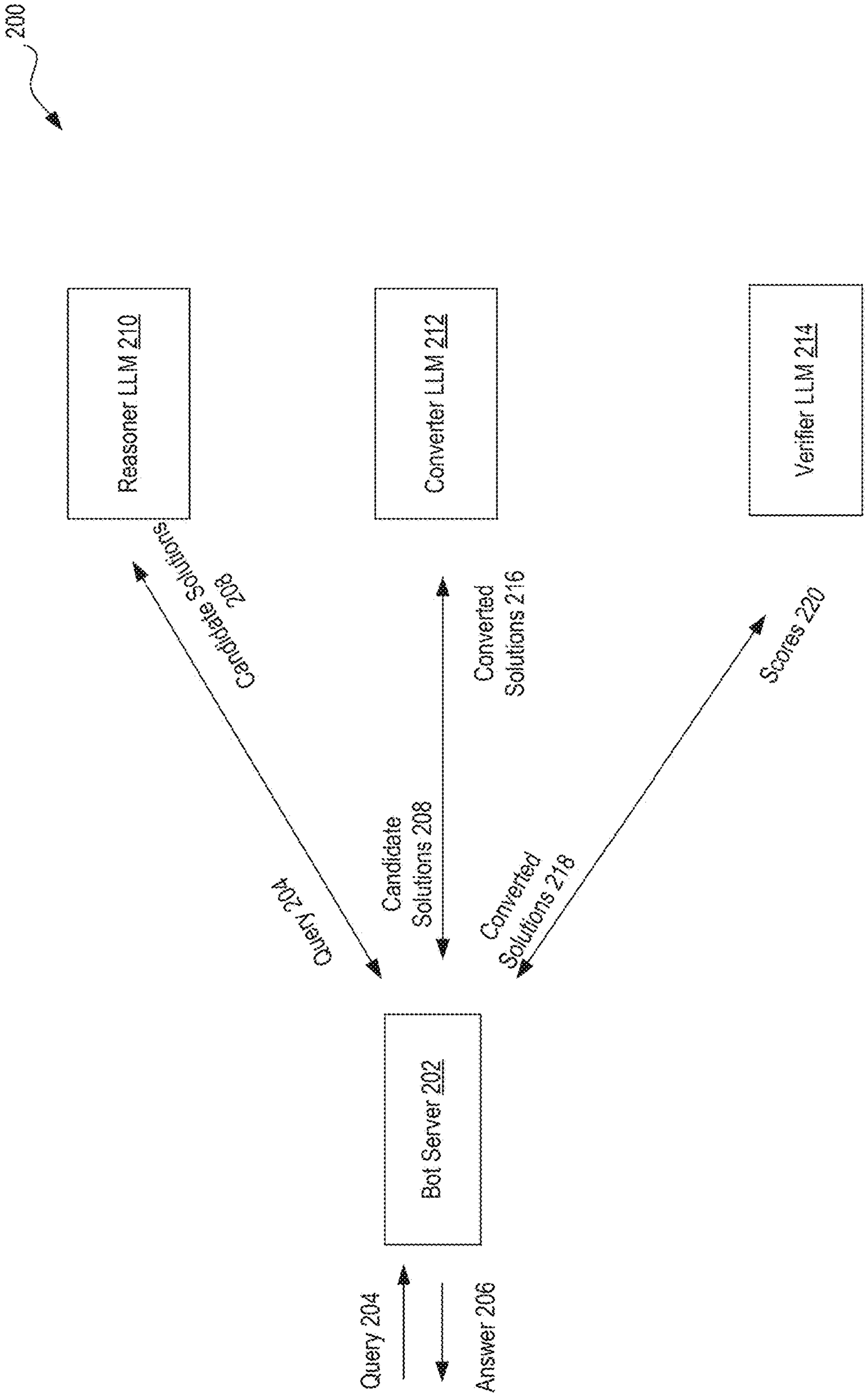
FIG. 2 is a simplified diagram illustrating a LLM reasoning framework with a verifier LLM, according to some embodiments.

FIG. 2 shows a LLM reasoning framework 200 configured to generate an answer in response to a query, e.g., a user's utterance. LLM reasoning framework 200 may have reasoning capabilities and may generate answers to mathematical questions, coding questions, etc. LLM reasoning framework 200 may include a bot server 202, a reasoner LLM 210, a converter LLM 212, and a verifier LLM 214. Bot server 202 may be communicatively connected to reasoner LLM 210, converter LLM 212, and verifier LLM 214 through respective application programming interfaces (APIs). Bot server 202 may be installed on a user device (e.g., 104) or may be situated remotely and communicatively connected to the user device. In some embodiments, bot server 202 may include a chatbot that responds to a query 204 with an answer 206. LLM reasoning framework 200 may be used to generate a training dataset to train verifier LLM 214, and process the input of verifier LLM 214 to generate answers with improved accuracy.

Reasoner LLM 210 may have reasoning capabilities and generate a solution in response to a question/query. In various embodiments, the solution generated by reasoner LLM 210 may include a chain-of-thought (CoT) format and/or a program-of-thought (PoT) format. A CoT format may include a natural language description showing step-by-step reasoning to obtain a result as the solution, while a PoT format may include a piece of code or pseudo code showing the reasoning to obtain a result as the solution. For ease of description, a solution of CoT format may be referred to as a CoT solution, and a solution of PoT format may be referred to as a PoT solution. Converter LLM 212 may convert a CoT solution to the PoT format, and may generate a natural language description of a PoT solution. The verifier LLM 214 may generate a score in response to an input based on preference obtained in the training process. Bot server 202 may rank the solutions based on the scores, and may select an answer with the solution of the highest score. Reasoner LLM 210 may include a general-purpose LLM such as GPT-4, LLAMA, Mistral etc., and/or a specialized LLM such as a math-specialized LLM (e.g., Minerva) or a code-specialized LLM (e.g., Codex). Converter LLM 212 may having both match reasoning and coding capabilities, such as DeepseekV2. Verifier LLM 214 may include a general-purpose LLM such as Mistral.

Bot server 202 may receive query 204 (e.g., an input question) from a user and may transmit an input prompt combining query 204 and an instruction to reasoner LLM 210, through a respective API, as an input. The instruction may cause reasoner LLM 210 to generate one or more candidate solutions 208. In various embodiments, candidate solutions 208 may include CoT solutions (e.g., math solutions) and/or PoT solutions (e.g., code solutions).

In an example, query 204 may include "Lee mows one lawn and charges \$33. Last week he mowed 16 lawns and three customers each gave him a \$10 tip. How many dollars did Lee earn mowing lawns last week?" A CoT solution generated by reasoner LLM 210 may include "Lee charges \$33 for mowing one lawn, and he mowed 16 lawns last week. So the total amount of money he earned from mowing lawns is \$33×16=\$528. Three customers gave him a \$10 tip each, so the total amount of money he earned from tips is \$10×3=\$30. To find out how much money Lee earned in total last week, we add the money he earned from mowing lawns to the money he earned from tips: \$528+\$30=\$558. The answer is \$\\boxed {558} \$." A PoT solution generated by reasoner LLM 210 may include:

```
def solution( ):
    earnings__from__mowing = 33×16
```

-continued

```
  earnings_from_tips = 10×3
  total_earnings = earnings_from_mowing + earnings_from_tips
  return total_earnings
Execution Results: 558
```

Reasoner LLM 210 may transmit candidate solutions 208 to bot server 202. Upon receiving candidate solution 208, bot server 202 may transmit an input prompt that combines candidate solutions 208 and query 204 to converter LLM 212 via a respective API. The instruction may cause converter LLM 212 to generate one or more converted solutions 216 based on query 204, which may be generated by converting a CoT solution to a PoT format, or generating an explanation of a PoT solution. Converter LLM 212 may transmit the converted solutions 216 to bot server 202. Details of the answer generation based on format conversion may be described FIGS. 3A and 3B. Upon receiving the converted solutions 216, bot server 202 may transmit an input prompt combining a set of converted solutions 218, query 204, and an instruction to verifier LLM 214 via a respective API. The instruction may cause verifier LLM 214 to generate a score for each of the converted solutions conditioned on query 204. In some embodiments, the score may include a probability of the converted solution. Verifier LLM 214 may transmit generated scores 220 to bot server 202, which may rank the converted solutions based on their respective scores. Bot server 202 may select a converted solution with the highest score as answer 206, which is outputted to the user.

Figure 3A:
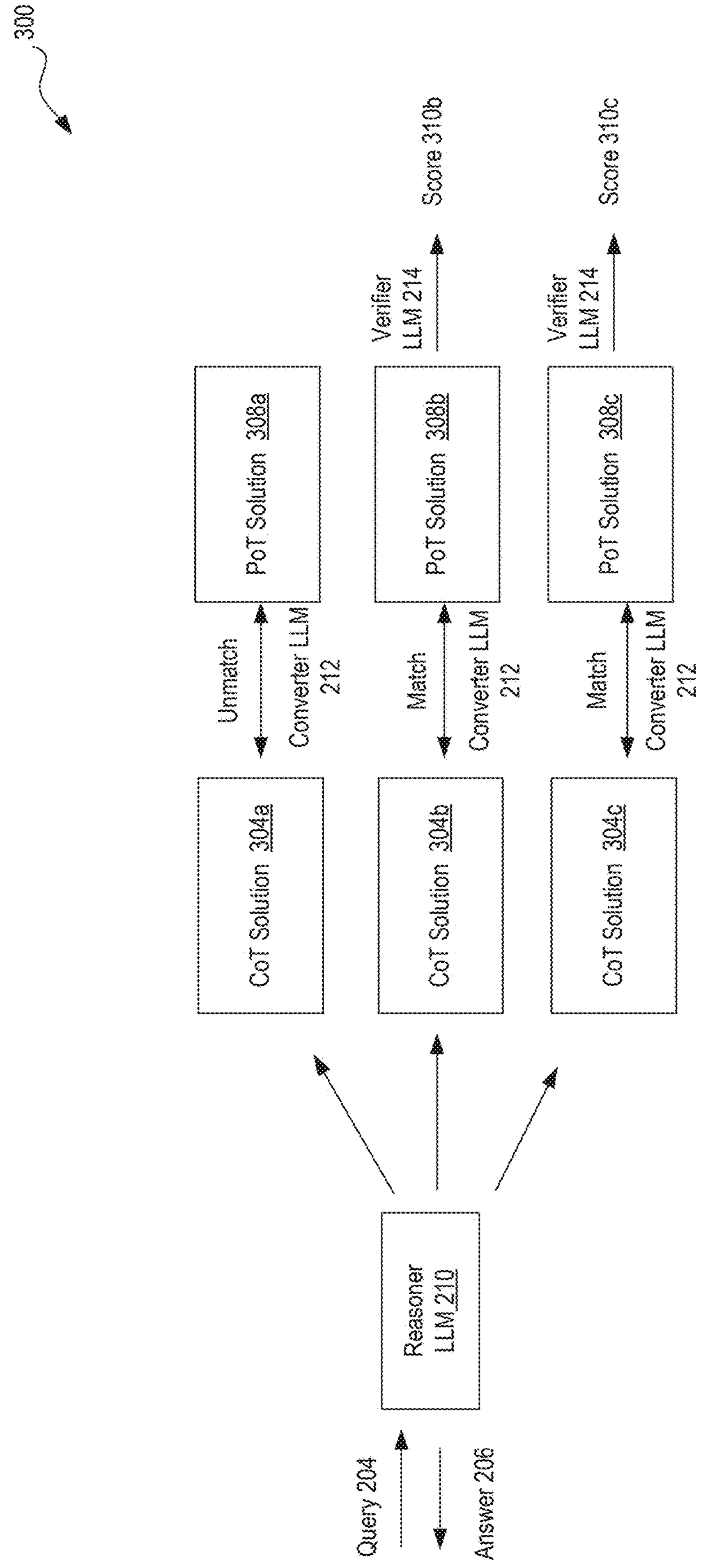
FIG. 3A is a simplified diagram illustrating data conversion of chain-of-thought (CoT) solutions for a verifier LLM, according to some embodiments.

FIG. 3A shows an operation 300 of framework 200 generate answer 206 by converting CoT solutions to PoT solutions, according to some embodiments. Upon receiving query 204, reasoner LLM 210 may generate a plurality of CoT solutions, e.g., 304*a*, 304*b*, and 304*c*, which are examples of candidate solutions 208. As described in FIG. 2, converter LLM 212 may convert each CoT solution to its PoT counterpart, e.g., PoT solutions 308*a*, 308*b*, and 308*c*.

For example, CoT solutions $S_{CoT}$ converted into PoT counterparts $S_{PoT}$ based on problem descriptions Q (e.g., query 204) may be described in equation (1):

$$S_{PoT} = \text{Coder } LLM \ (Q, S_{CoT}). \tag{1}$$

In some embodiments, bot server 202 may execute $S_{PoT}$ in an execution environment (e.g., a Python interpreter) to obtain a result, and verify whether the result matches the result from $S_{CoT}$. The motivation may be that logical errors in $S_{PoT}$ may cause run-time errors in $S_{PoT}$, while calculation errors in $S_{PoT}$ may result in mismatched results between $S_{CoT}$ and $S_{PoT}$, as PoT solutions may ensure calculation correctness by using the Python interpreter. This approach takes advantage of the executable nature of program-based solutions. Bot server 202 may filter out/remove CoT solutions that do not match their PoT counterparts, and may transmit one or more CoT solutions that match their PoT counterparts in converted solutions 218 to verifier LLM 214. As shown in FIG. 3A, as an example, CoT solution 304*a* and PoT solution 308*a* are a mismatch, while CoT solution 304*b* matches PoT solution 308*b* and CoT solution 304*c* matches PoT solution 308*c*. Bot server 202 may filter out PoT solution 308*a*, and transmit PoT solutions 308*b* and 308*c* to verifier LLM 214, which generates their respective probabilities as scores 310*b* and 310*c*. In an example, bot server 202 may rank scores 310*b* and 310*c*, and may select the highest score and return it as answer 206.

Figure 3B:
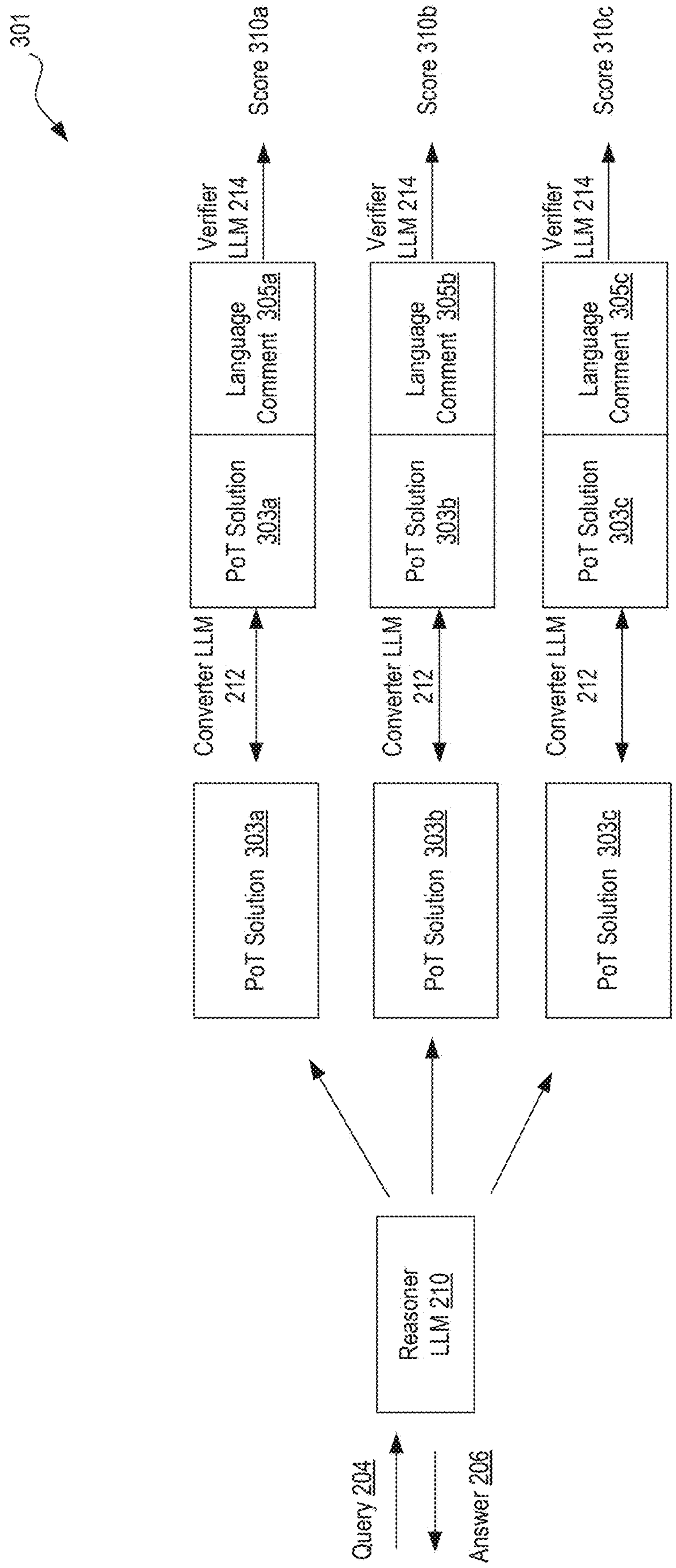
FIG. 3B is a simplified diagram illustrating data conversion of program-of-thought (PoT) solutions for a verifier LLM, according to some embodiments.

FIG. 3B shows an operation 301 of framework 200 generate answer 206 by generating explanation based on PoT solutions, according to some embodiments. Upon receiving query 204, reasoner LLM 210 may generate a plurality of PoT solutions, e.g., 303*a*, 303*b*, and 303*c*, which are examples of candidate solutions 208. As described in FIG. 2, converter LLM 212 may generate explanation/description in natural language ("language comment") 305*a*, 305*b*, and 305*c* for PoT solutions 303*a*, 303*b*, and 303*c* based on PoT solutions 303*a*, 303*b*, and 303*c* and query 204. In some embodiments, converter LLM 212 generates both the code solution $S_{PoT}$ (e.g., 303*a*, 303*b*, 303*c*) and the corresponding step-by-step description Spes (e.g., 305*a*, 305*b*, 305*c*) that explains why the solution is correct. In some embodiments, using the same converter LLM 212 for both code and description generation reduces over-reliance on external LLMs. $S_{PoT}$ and $S_{Des}$ may be concatenated as an integrated input for verifier LLM 214, as shown in equation (2). This method provides richer information in the code solutions, making the LLM-based verification process more effective.

$$S_{Des} = \text{Coder } LLM \ (Q, S_{PoT}) \tag{2}$$

Bot server 202 may concatenate each PoT solution and its explanation as an input to verifier LLM 214, which generates a respective probability as the score, e.g., score 310*a*, 310*b*, or 310*c*. In an example, bot server 202 may rank scores 310*a*-310*c*, and may select the highest score and return it as answer 206.

Figure 3C:
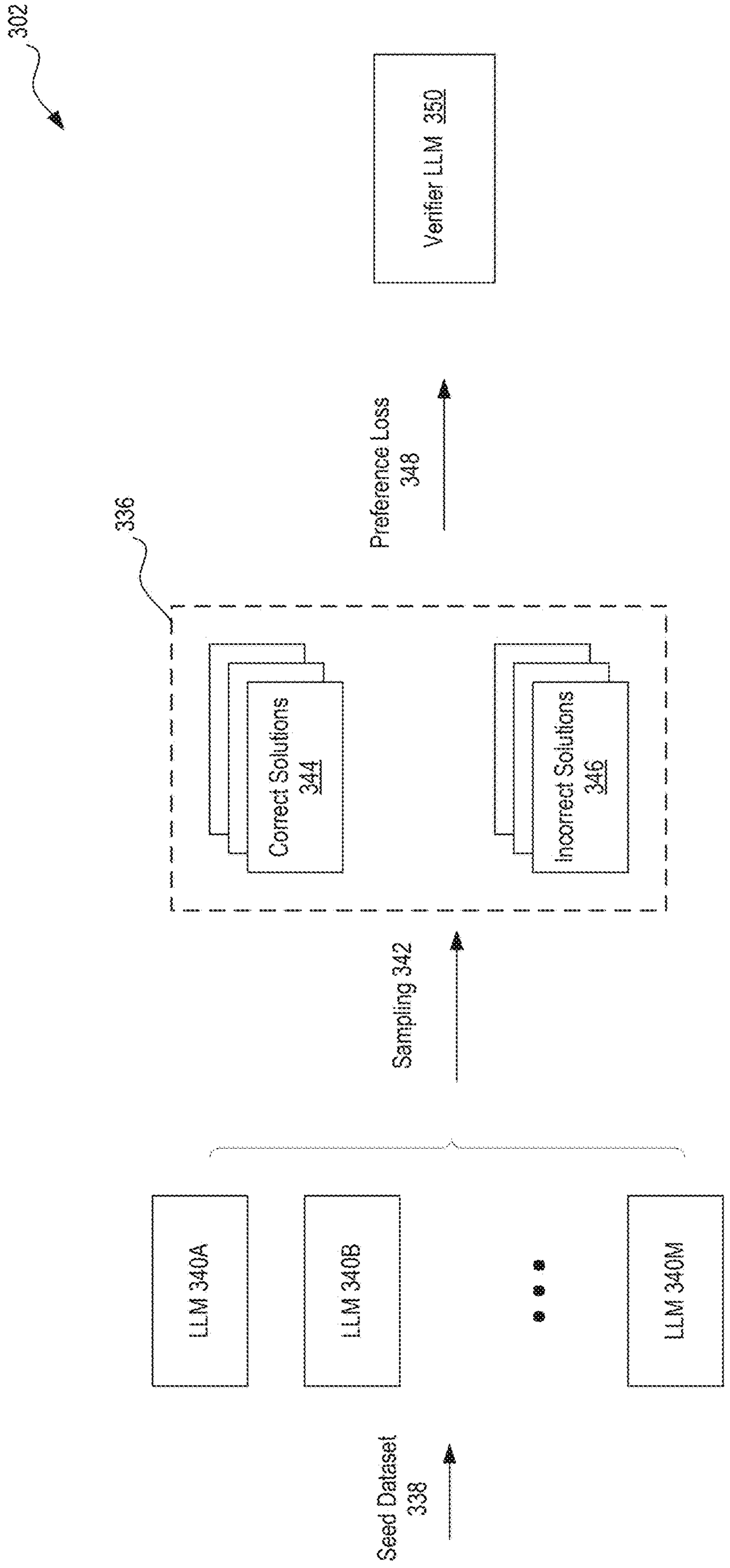
FIG. 3C is a simplified diagram illustrating a training process of a verifier LLM, according to some embodiments.

FIG. 3C shows a training process 302, performed by bot server 202, that generates a training dataset 336 and trains a verifier LLM 305 using training dataset 336, according to some embodiments. The trained verifier LLM 350 may be an example of verifier LLM 214. The training dataset 336 may include a plurality of correct solutions 344 and a plurality of incorrect solutions 346, forming pairs of (correct solutions, incorrect solutions) each corresponds to a question/query. By feeding verifier LLM 350 with pairs of (correct solutions, incorrect solutions), designated as chosen and rejected outputs, and applying a training method, verifier LLM 350 may be trained to assign higher generation probabilities to correct solutions over incorrect ones. Then the probability can be served as the score for ranking the solutions. In some embodiments, if verifier LLM 350 is configured to verify math solutions, verifier LLM 350 may be trained on CoT solutions; and if verifier LLM 350 is configured to verify code solutions, verifier LLM 350 may be trained on PoT solutions.

First, training dataset 336 is generated. Training dataset 336 may include training data for math reasoning and/or code reasoning. To generate training data for math reasoning, a seed dataset 338 may be fed into one or more LLMs 340A, 340B, . . . , 340M, as input. Although not shown, in some embodiments, LLMs 340A, . . . , 340M may be communicatively coupled to bot server 202 via respective APIs. Bot server 202 may receive training queries and seed datasets for LLMs 340A, . . . , 340M to generate corresponding training data. Seed dataset 338 may be accessible to or stored by bot server 202. In some embodiments, bot server 202 may transmit an input prompt combining seed dataset 338 and instructions that cause LLMs 340A, . . . , 340M to generate a plurality of solutions to seed dataset 338. Details are described as follows.

To generate training data for math reasoning, LLMs 340A-340M may include one or more general-purpose LLM such as Mistral (Albert Q Jiang, Alexandre Sablayrolles, Arthur Mensch, Chris Bamford, Devendra Singh Chaplot, Diego de las Casas, Florian Bressand, Gianna Lengyel, Guillaume Lample, Lucile Saulnier, et al. Mistral 7b. *arXiv preprint arXiv:*2310.06825, 2023.) and Phi3 (Marah Abdin, Sam Ade Jacobs, Ammar Ahmad Awan, Jyoti Aneja, Ahmed Awadallah, Hany Awadalla, Nguyen Bach, Amit Bahree, Arash Bakhtiari, Harkirat Behl, et al. Phi-3 technical re-port: A highly capable language model locally on your phone. *arXiv preprint arXiv:*2404.14219, 2024.) and one or more math-specialized LLMs such as InternLM2-Math (Huaiyuan Ying, Shuo Zhang, Linyang Li, Zhejian Zhou, Yunfan Shao, Zhaoye Fei, Yichuan Ma, Jiawei Hong, Kuikun Liu, Ziyi Wang, et al. Internlm-math: Open math large language models toward verifiable reasoning. *arXiv preprint arXiv:* 2402.06332, 2024.) and MammoTH2-plus (Xiang Yue, Tuney Zheng, Ge Zhang, and Wenhu Chen. Mammoth2: Scaling instructions from the web. *arXiv preprint arXiv:* 2405.03548, 2024c.). In some embodiments, seed dataset 338 include one or more math questions, and may be from GSM8k (Karl Cobbe, Vineet Kosaraju, Mohammad Bavarian, Mark Chen, Heewoo Jun, Lukasz Kaiser, Matthias Plappert, Jerry Tworek, Jacob Hilton, Reiichiro Nakano, et al. Training verifiers to solve math word problems. *arXiv preprint arXiv:*2110.14168, 2021.) and/or MATH (Dan Hendrycks, Collin Burns, Saurav Kadavath, Akul Arora, Steven Basart, Eric Tang, Dawn Song, and Jacob Steinhardt. Measuring mathematical problem solving with the math dataset. In *Thirty-fifth Conference on Neural Information Processing Systems Datasets and Benchmarks Track* (*Round* 2), 2021.). For each question/query, bot server 202 may perform sampling 342 by selecting a plurality of CoT solutions and removing duplicates. Using functions provided by (Huaiyuan Ying, Shuo Zhang, Linyang Li, Zhejian Zhou, Yunfan Shao, Zhaoye Fei, Yichuan Ma, Jiawei Hong, Kuikun Liu, Ziyi Wang, et al. Internlm-math: Open math large language models toward verifiable reasoning. *arXiv preprint arXiv:*2402.06332, 2024.), bot server 202 may extract CoT solutions from model predictions and compare them with ground truth to select a plurality of correct solutions and at least one incorrect solution correspond to each query/question. In some embodiments, the training data for math reasoning may include a plurality of math questions/queries and a plurality of pairs of CoT solutions (correct solution 344, incorrect solution 346) corresponding to the math questions/queries.

To generate training data for code reasoning, seed dataset 338 include one or more code questions, may be from MBPP (Jacob Austin, Augustus Odena, Maxwell Nye, Maarten Bosma, Henryk Michalewski, David Dohan, Ellen Jiang, Carrie Cai, Michael Terry, Quoc Le, et al. Program synthesis with large language models. *arXiv preprint arXiv:* 2108.07732, 2021.) and Python subset of MagiCoder-75k (Yuxiang Wei, Zhe Wang, Jiawei Liu, Yifeng Ding, and Lingming Zhang. Magicoder: Empowering code generation with oss-instruct. In *Forty-first International Conference on Machine Learning,* 2024.). In some embodiments, LLMs 340A-340M may include one or more general-purpose LLM such as LLaMA-3-8B (Hugo Touvron, Louis Martin, Kevin Stone, Peter Albert, Amjad Almahairi, Yasmine Babaei, Niko-lay Bashlykov, Soumya Batra, Prajjwal Bhargava, Shruti Bhosale, et al. Llama 2: Open foundation and fine-tuned chat models. *arXiv preprint arXiv:*2307.09288, 2023b.) and Phi3 (Marah Abdin, Sam Ade Jacobs, Ammar Ahmad Awan, Jyoti Aneja, Ahmed Awadallah, Hany Awadalla, Nguyen Bach, Amit Bahree, Arash Bakhtiari, Harkirat Behl, et al. Phi-3 technical re-port: A highly capable language model locally on your phone. *arXiv preprint arXiv:*2404.14219, 2024.) and one or more code-specialized LLMs such as CodeGemma-7B-it (CodeGemma Team. Codegemma: Open code models based on gemma. *arXiv preprint arXiv:*2406.11409, 2024a.) and CodeQwen1.5 (Qwen Team. Code with codeqwen1.5, April 2024b. URL https://qwenlm.github.io/blog/codeqwen1.5/.). A LLM (e.g., GPT-4o) may be used to generate test cases for each question/query. For each question/query, bot server 202 may perform sampling 342 by selecting a plurality of PoT solutions that pass test cases. In some embodiments, test cases that match the reference solution are retained. If no generated test case matches the reference solution, the process may be repeated with a temperature of 0.8 up to three times. Bot server 202 may select a plurality of pairs of PoT solutions (correct solution 344, incorrect solution 346) corresponding to the code questions/queries.

Bot server 202 may train verifier LLM 350 using training dataset 336. A plurality of pairs of CoT (correct solution, incorrect solution) for math reasoning or a plurality of pairs of PoT (correct solution, incorrect solution) for code reasoning may be used, together with respective training queries, as input data for verifier LLM 350. Verifier LLM 350 may generate a first candidate score/probability in response to a correct solution and a second score/probability in response to an incorrect solution. Bot server 202 may compute training objective, e.g., a preference loss 348, by comparing the first candidate score with the second candidate score for each training query. In some embodiments, the training method is referred to as SimPO, as discussed by Meng et al. (Yu Meng, Mengzhou Xia, and Danqi Chen, "*Simpo: Simple preference optimization with a reference-free reward*", 2024.) The parameters of verifier LLM 350 may be updated through backpropagation to minimize preference loss 348.

Computer and Network Environment

Figure 4A:
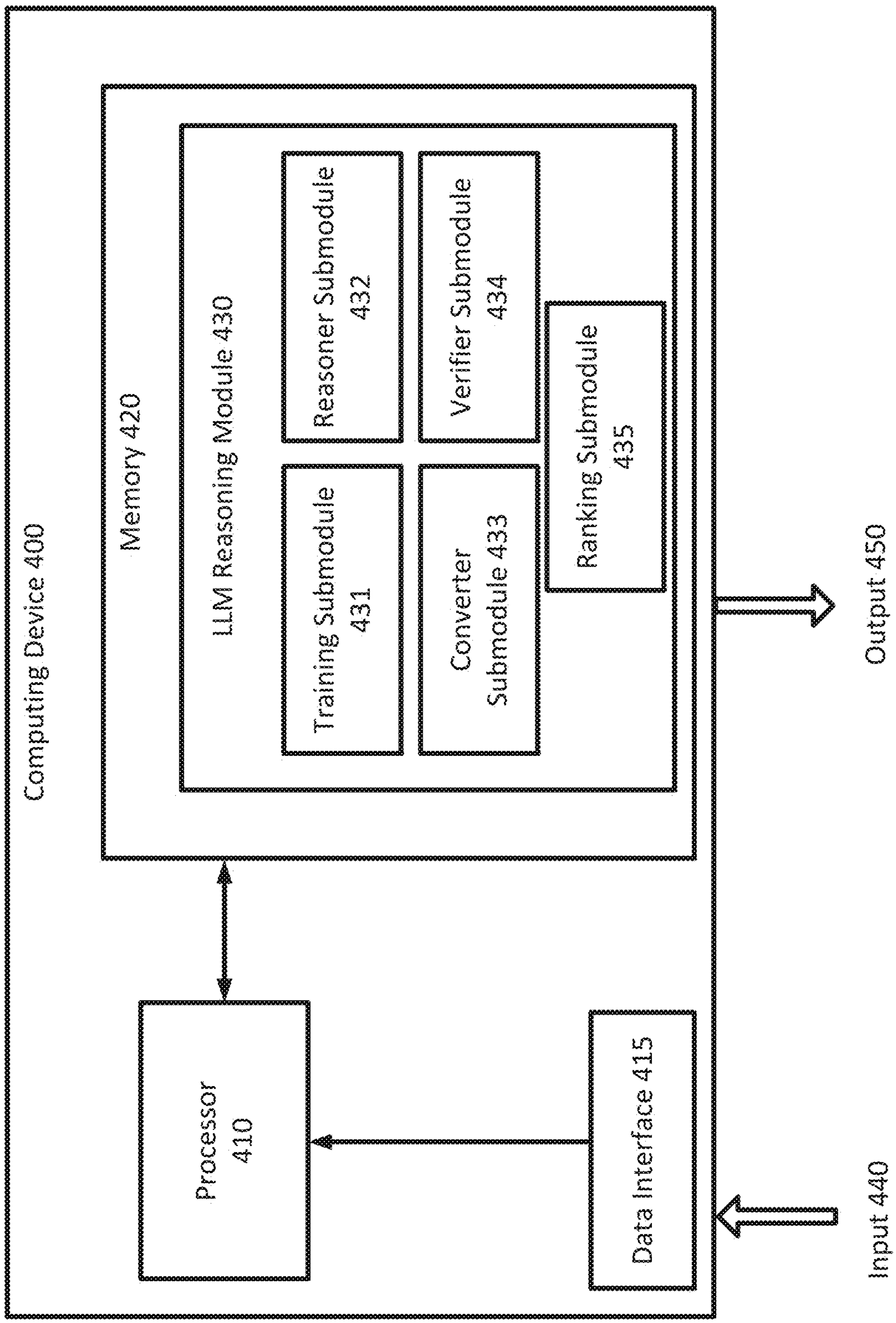
FIG. 4A is a simplified diagram illustrating a computing device implementing the verifier training and utilization framework described in FIGS. 2 and 3A-3C, according to some embodiments.

FIG. 4A is a simplified diagram illustrating a computing device implementing the LLM reasoning framework described in FIGS. 1, 2, 3A-3C, according to one embodiment described herein. As shown in FIG. 4A, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

Figure 4B:
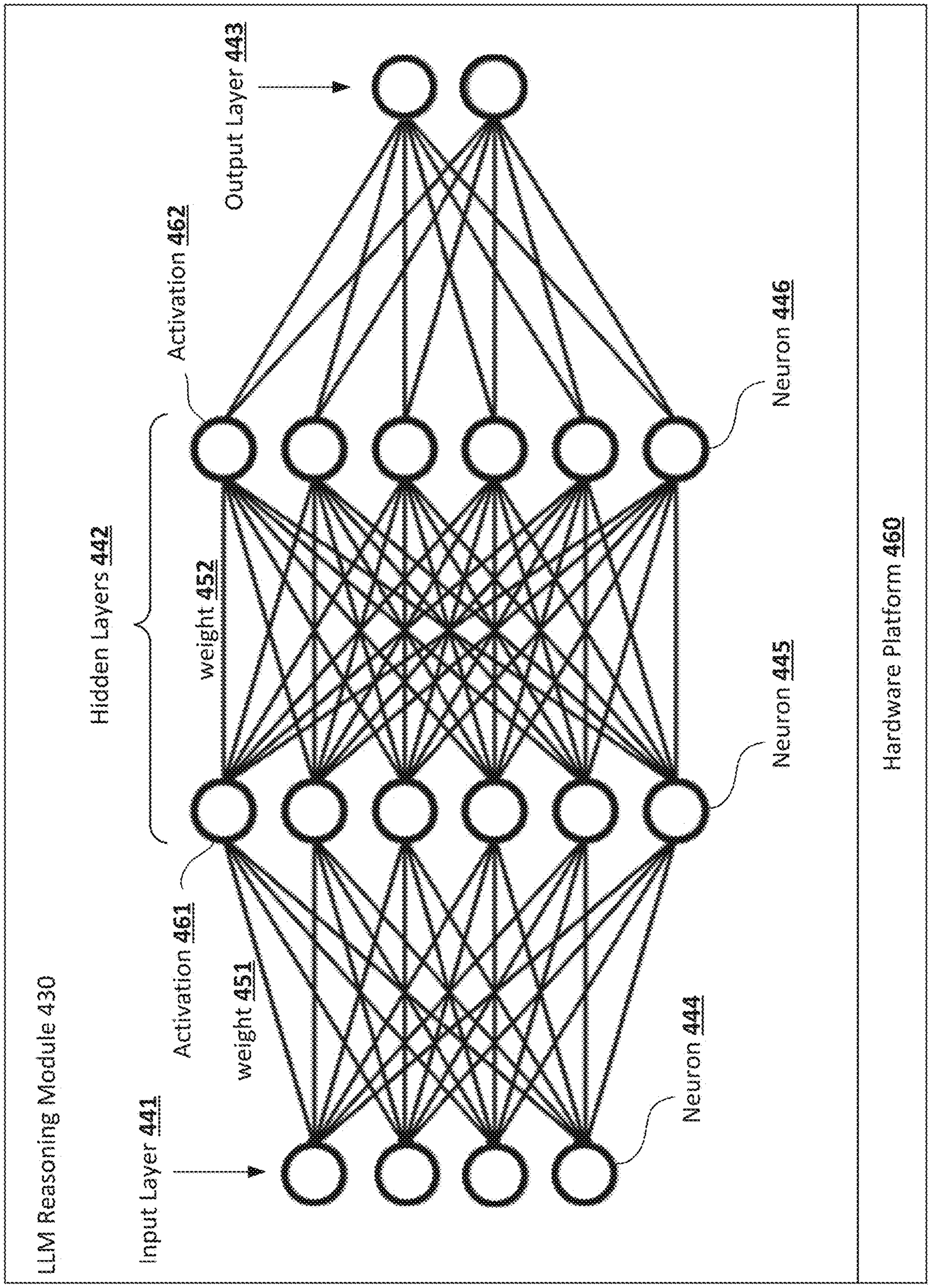
FIG. 4B is a simplified diagram illustrating a neural network structure, according to some embodiments.

In another embodiment, processor 410 may comprise multiple microprocessors and/or memory 420 may comprise multiple registers and/or other memory elements such that processor 410 and/or memory 420 may be arranged in the form of a hardware-based neural network, as further described in FIG. 4B.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for LLM reasoning module 430 that may be used to implement and/or emulate the systems and models, and/or to implement any of the methods described further herein. LLM reasoning module 430 may receive input 440 such as an input training data (e.g., a training query and a seed dataset) via the data interface 415 and generate an output 450 which may be a solution to the training query conditioned on the seed dataset.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as a training query, from a user via the user interface.

In some embodiments, the LLM reasoning module 430 is configured to generate training data for training the verifier LLM, and generate a solution in response to a question/query asked by a user. The LLM reasoning module 430 may further include a training submodule 431, a reasoner submodule 432, a converter submodule 433, a verifier submodule 434, and a ranking submodule 435. Submodules 431-435 may perform similar operations as bot server 202 in FIG. 2. Training submodule 431 may configured to generate input prompts that cause a plurality of LLMs (e.g., 340A, . . . , 340M) to generate solution pairs, and train a verifier LLM (e.g., 350) based on the solution pairs. Reasoner submodule 432 may be configured to generate an input prompt that causes a reasoner LLM (e.g., 210) to generate candidate solutions (e.g., 208) in response to a query (e.g., 204). Converter submodule 208 may be configured to cause a converter LLM (e.g., 212) to convert CoT solutions (e.g., ***304a*-*304c*) to PoT solutions (e.g., *308a*-*308c*) and filter the converted PoT solutions. Converter submodule 208 may also be configured to cause a converter LLM (e.g., 212) to convert PoT solutions (e.g., *303a*-*303c*) to PoT solutions with language comments (e.g., *305a*-*305c*). Verifier submodule 433 may be configured to generate an input prompt that causes a verifier LLM (e.g., 314, a trained verifier LLM) to generate scores of the converted solutions (e.g., 218). Ranking submodule 435 may rank the converted solutions based on the scores, and select one with the highest score as an output (e.g., 206) to a user device (e.g., 104**).

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 4B is a simplified diagram illustrating the neural network structure implementing the LLM reasoning module 430 described in FIG. 4A, according to some embodiments. In some embodiments, the LLM reasoning module 430 and/or one or more of its submodules 431-435 may be implemented at least partially via an artificial neural network structure shown in FIG. 4B. The neural network comprises a computing system that is built on a collection of connected units or nodes, referred to as neurons (e.g., 444, 445, 446). Neurons are often connected by edges, and an adjustable weight (e.g., 451, 452) is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 440 in FIG. 4A), such as a training query and a seed dataset. The number of nodes (neurons) in the input layer 441 may be determined by the dimensionality of the input data (e.g., the length of a vector of a training query and a seed dataset). Each node in the input layer represents a feature or attribute of the input.

The hidden layers 442 are intermediate layers between the input and output layers of a neural network. It is noted that two hidden layers 442 are shown in FIG. 4B for illustrative purpose only, and any number of hidden layers may be utilized in a neural network structure. Hidden layers 442 may extract and transform the input data through a series of weighted computations and activation functions.

For example, as discussed in FIG. 4A, the LLM reasoning module 430 receives an input 440 of a training query and a seed dataset and transforms the input into an output 450 of an output solution. To perform the transformation, each neuron receives input signals, performs a weighted sum of the inputs according to weights assigned to each connection (e.g., 451, 452), and then applies an activation function (e.g., 461, 462, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the LLM reasoning module 430 and/or one or more of its submodules 431-435 may comprise the transformative neural network structure of layers of neurons, and weights and activation functions describing the non-linear transformation at each neuron. Such a neural network structure is often implemented on one or more hardware processors 410, such as a graphics processing unit (GPU). An example neural network may be an open-weight LLM such as Mistral-7B, and/or the like.

In one embodiment, the LLM reasoning module 430 and its submodules 431-435 may comprise one or more LLMs built upon a Transformer architecture. For example, the Transformer architecture comprises multiple layers, each consisting of self-attention and feedforward neural networks. The self-attention layer transforms a set of input tokens (such as words) into different weights assigned to each token, capturing dependencies and relationships among tokens. The feedforward layers then transform the input tokens, based on the attention weights, represents a high-dimensional embedding of the tokens, capturing various linguistic features and relationships among the tokens. The self-attention and feed-forward operations are iteratively performed through multiple layers of self-attention and feedforward layers, thereby generating an output based on the context of the input tokens. One forward pass for an input tokens to be processed through the multiple layers to generate an output in a Transformer architecture often entail hundreds of teraflops (trillions of floating-point operations) of computation.

In one embodiment, the LLM reasoning module 430 and its submodules 431-435 may be implemented by hardware, software and/or a combination thereof. For example, the LLM reasoning module 430 and its submodules 431-435 may comprise a specific neural network structure implemented and run on various hardware platforms 460, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 460 used to implement the neural network structure is specifically configured based on factors such as the complexity of the neural network, the scale of the tasks (e.g., training time, input data scale, size of training dataset, etc.), and the desired performance.

In another embodiment, some or all of layers 441, 442, 443 and/or neurons 442, 445, 446, and operations there between such as activations 461, 462, and/or the like, of the LLM reasoning module 430 and its submodules 431-435 may be realized via one or more ASICs. For example, each neuron 442, 445 and 446 may be a hardware ASIC comprising a register, a microprocessor, and/or an input/output interface. For another example, operations among the neurons and layers may be implemented through an ASIC TPU. For yet another example, some operations among the neurons and layers such as a softmax operation, an activation function (such as a rectified linear unit (ReLU), sigmoid linear unit (SiLU), and/or the like) may be implemented by one or more ASICs.

For example, the LLM reasoning module 430 may generate, by at least one ASIC (such as a TPU, etc.) performing a multiplicative and/or accumulative operation for a neural network language model, a next token based at least in prat on previously generated tokens, and in turn generate a natural language output representing the next-step action combining a sequence of generated tokens.

In one embodiment, the neural network based LLM reasoning module 430 and one or more of its submodules 431-435 may be trained by iteratively updating the underlying parameters (e.g., weights 451, 452, etc., bias parameters and/or coefficients in the activation functions 461, 462 associated with neurons) of the neural network based on the loss described in SimPO. For example, during forward propagation, the training data such as pairs of (correct solutions, incorrect solutions) generated by a plurality of LLMs conditioned on a training query and a seed dataset, are fed into the neural network. The data flows through the network's layers 441, 442, with each layer performing computations based on its weights, biases, and activation functions until the output layer 443 produces the network's output 450. In some embodiments, output layer 443 produces an intermediate output on which the network's output 450 is based.

The output generated by the output layer 443 is compared to the expected output (e.g., a "ground-truth" such as the corresponding correct solutions) from the training data, to compute a loss function that measures the discrepancy between the predicted output and the expected output. For example, the loss function may be cross entropy, MMSE, or a combination thereof. Given the loss, the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

In one embodiment, the neural network based LLM reasoning module 430 and one or more of its submodules 431-435 may be trained using policy gradient methods, also referred to as "reinforcement learning" methods. For example, instead of computing a loss based on a training output generated via a forward propagation of training data, the "policy" of the neural network model, which is a mapping from an input of the current states or observations of an environment the neural network model is operated at, to an output of action. Specifically, at each time step, a reward is allocated to an output of action generated by the neural network model. The gradients of the expected cumulative reward with respect to the neural network parameters are estimated based on the output of action, the current states of observations of the environment, and/or the like. These gradients guide the update of the policy parameters using gradient descent methods like stochastic gradient descent (SGD) or Adam. In this way, as the "policy" parameters of the neural network model may be iteratively updated while generating an output action as time progresses, the boundaries between training and inference are often less distinct compared to supervised learning—in other words, backward propagation and forward propagation may occur for both "training" and "inference" stages of the neural network mode.

In one embodiment, LLM reasoning module 430 and its submodules 431-435 may be housed at a centralized server (e.g., computing device 400) or one or more distributed servers. For example, one or more of LLM reasoning module 430 and its submodules 431-435 may be housed at external server(s). The different modules may be communicatively coupled by building one or more connections through application programming interfaces (APIs) for each respective module. Additional network environment for the distributed servers hosting different modules and/or submodules may be discussed in FIG. 5.

During a backward pass, parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generating a solution in response to a question/query.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

In some implementations, to improve the computational efficiency of training a neural network model, "training" a neural network model such as an LLM may sometimes be carried out by updating the input prompt, e.g., the instruction to teach an LLM how to perform a certain task. For example, while the parameters of the LLM may be frozen, a set of tunable prompt parameters and/or embeddings that are usually appended to an input to the LLM may be updated based on a training loss during a backward pass. For another example, instead of tuning any parameter during a backward pass, input prompts, instructions, or input formats may be updated to influence their output or behavior. Such prompt designs may range from simple keyword prompts to more sophisticated templates or examples tailored to specific tasks or domains.

In general, the training and/or finetuning of an LLM can be computationally extensive. For example, GPT-3 has 175 billion parameters, and a single forward pass using an input of a short sequence can involve hundreds of teraflops (trillions of floating-point operations) of computation. Training such a model requires immense computational resources, including powerful GPUs or TPUs and significant memory capacity. Additionally, during training, multiple forward and backward passes through the network are performed for each batch of data (e.g., thousands of training samples), further adding to the computational load.

In general, the training process transforms the neural network into an "updated" trained neural network with updated parameters such as weights, activation functions, and biases. The trained neural network thus improves neural network technology in generative AI. For example, chatbots built on the trained verifier LLM can provide answers with improved accuracy to a user's question.

Figure 5:
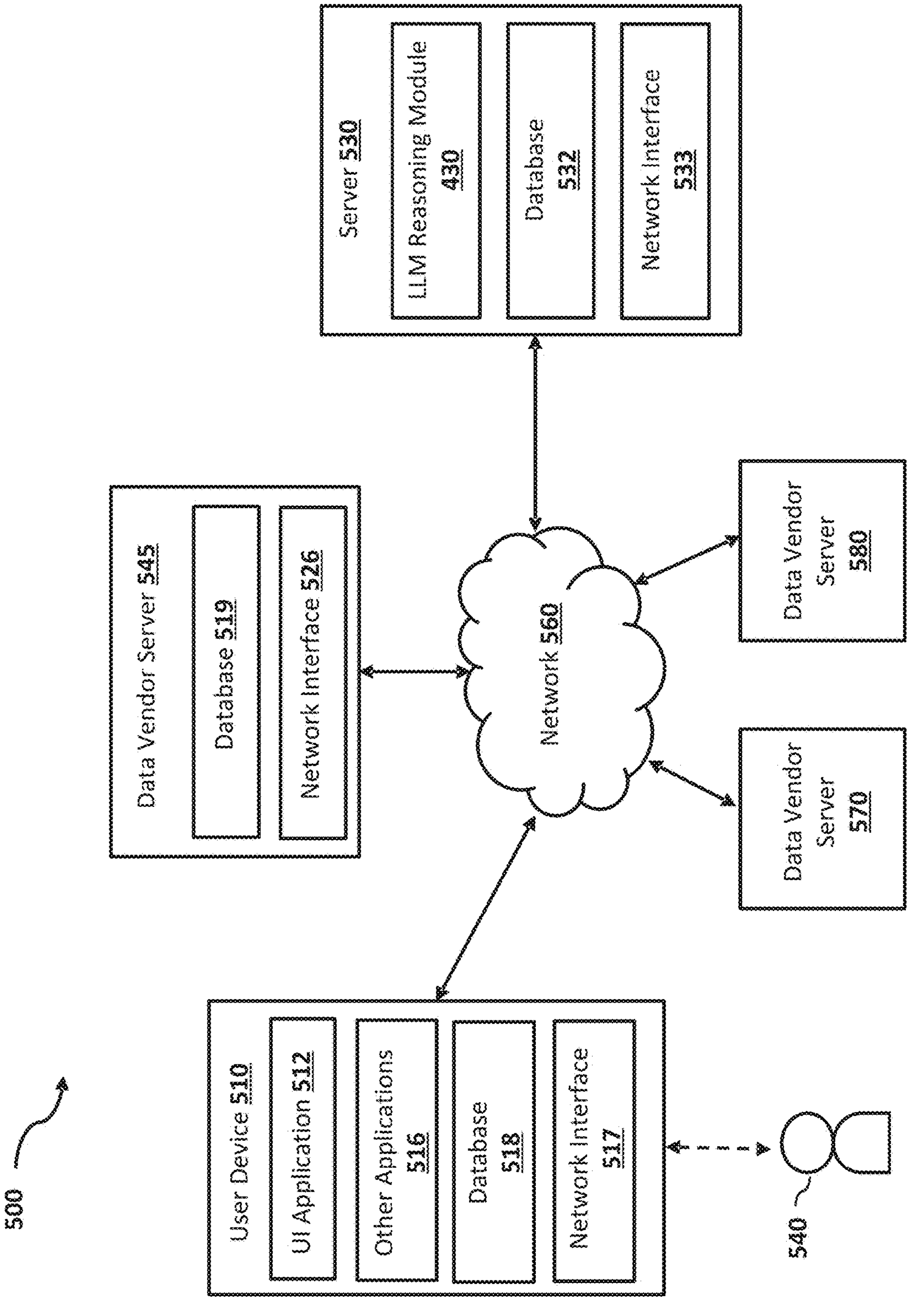
FIG. 5 is a simplified block diagram of a networked system suitable for implementing the verifier training and utilization framework described in FIGS. 2, 3A-3C, 4A, and 4B and other embodiments described herein.

FIG. 5 is a simplified block diagram of a networked system 500 suitable for implementing the LLM reasoning framework described in FIGS. 1, 2, 3A-3C, 4A, and 4B, and other embodiments described herein. In one embodiment, system 500 includes the user device 510 which may be operated by user 540, data vendor servers 545, 570 and 580, server 530, and other forms of devices, servers, and/or software components that operate to perform various methodologies in accordance with the described embodiments. Exemplary devices and servers may include device, standalone, and enterprise-class servers which may be similar to the computing device 400 described in FIG. 4A, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLER. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating an answer/a solution from the server 530 and display the message via the UI application 512. In other embodiments, user device 510 may include additional or different modules having specialized hardware and/or software as required.

In one embodiment, UI application 512 may communicatively and interactively generate a UI for an AI agent implemented through the LLM reasoning module 430 (e.g., an LLM agent) at server 530. In at least one embodiment, a user operating user device 510 may enter a user utterance, e.g., via text or audio input, such as a question, uploading a document, and/or the like via the UI application 512. Such user utterance may be sent to server 530, at which LLM reasoning module 430 may generate a response via the process described in FIGS. 1 and 2. The LLM reasoning module 430 may thus cause a display of code solution or math solution at UI application 512 and interactively update the display in real time with the user utterance.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view an answer, e.g., a code solution and/or a match solution.

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 517 adapted to communicate with data vendor server 545 and/or the server 530. In various embodiments, network interface component 517 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts database 519 to provide training datasets including seed dataset (and/or pairs of (correct solution, incorrection solution) generated based on the seed dataset) to the server 530. The database 519 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 519, via the network interface 526, to the server 530.

The server 530 may be housed with the LLM reasoning module 430 and its submodules described in FIG. 4A. In some implementations, LLM reasoning module 430 may receive data from database 519 at the data vendor server 545 via the network 560 to generate an answer. The generated answer may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the LLM reasoning module 430. In one implementation, the database 532 may store previously generated answers and/or pairs of (correct solution, incorrect solution), and the corresponding input feature vectors.

In some embodiments, database 532 may be local to the server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545, 570 or 580 over network 560. In various embodiments, network interface component 533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Example Work Flows

Figure 6:
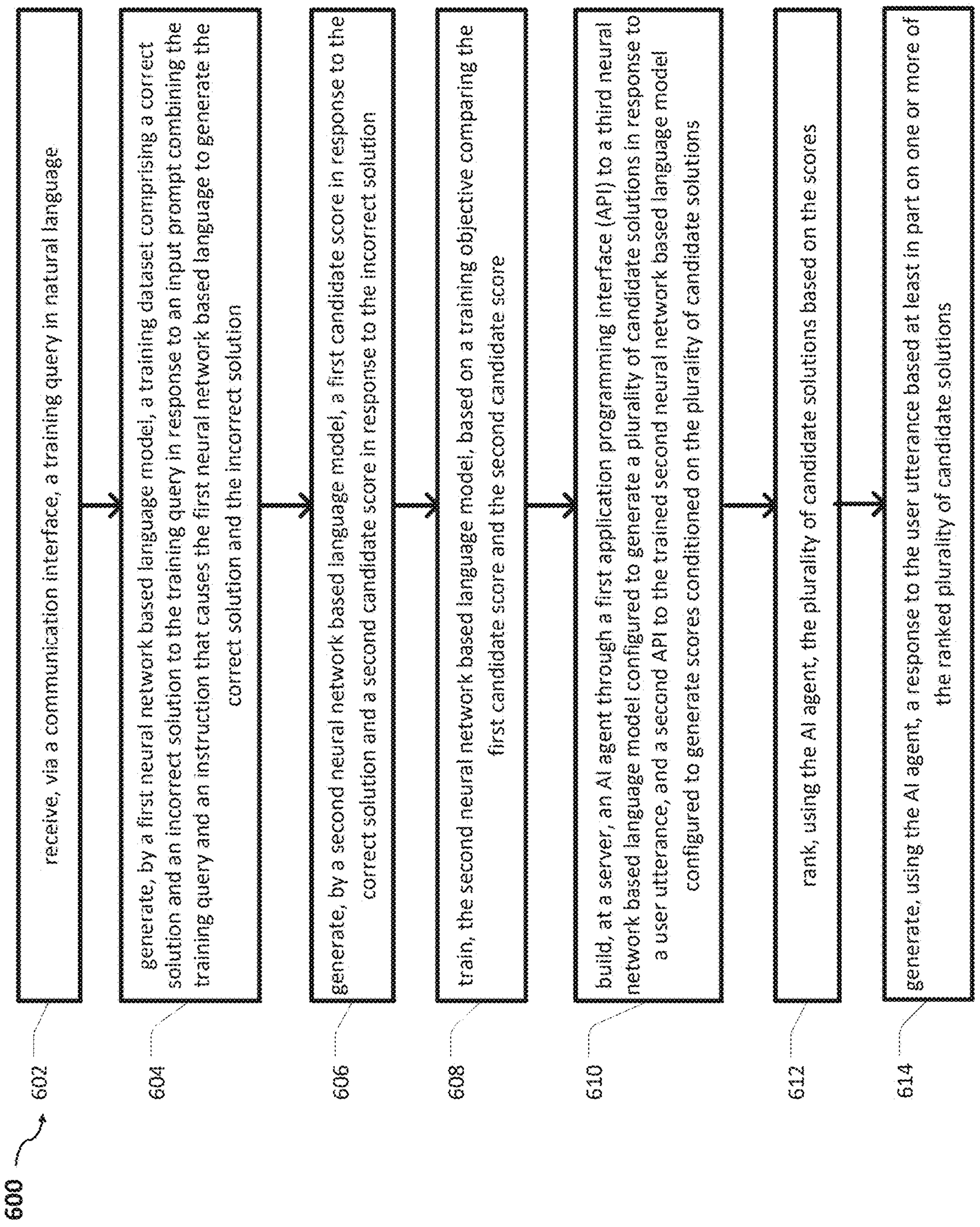
FIG. 6 is an example logic flow diagram illustrating a method of verifier LLM training based on the framework shown in FIGS. 2, 3A-3C, 4A, 4B, and 5, according to some embodiments.

FIG. 6 is an example logic flow diagram illustrating a method of training and utilizing a LLM reasoning framework based on the framework shown in FIGS. 1, 2, 3A, 3C, 4A, 4B, and 5, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the LLM reasoning module 430 (e.g., FIGS. 4A and 5) that performs training a verifier LLM, and generating an answer in response to a query with the use of the trained verifier LLM.

As illustrated, the method 600 includes a number of enumerated steps, but aspects of the method 600 may include additional steps before, after, and in between the enumerated steps. In some aspects, one or more of the enumerated steps may be omitted or performed in a different order.

At step 602, a training query in natural language is received via a communication interface At step 604, a training dataset is generated by a first neural network based language model. The training dataset includes a correct solution and an incorrect solution to the training query in response to an input prompt combining the training query and an instruction that causes the first neural network based language to generate the correct solution and the incorrect solution.

In some embodiments, the training query includes a math question, and the correct solution and the incorrect solution include math solutions. In some embodiments, the training query includes a code question, and the correct solution and the incorrect solution include code solutions. In some embodiments, the math solutions include chain-of-thought (CoT) solutions; and the code solutions include program-of-thought (PoT) solutions.

At step 606, a first candidate score in response to the correct solution and a second candidate score in response to the incorrect solution are generated by a second neural network based language model.

At step 608, the second neural network based language model is trained based on a training objective comparing the first candidate score and the second candidate score.

At step 610, an AI agent is built at a server through a first application programming interface (API) to a third neural network based language model configured to generate a plurality of candidate solutions in response to a user utterance, and through a second API to the trained second neural network based language model configured to generate scores conditioned on the plurality of candidate solutions.

In some embodiments, the building, at the server, the AI agent further includes: through a third API to a fourth neural network based language model configured to generate a plurality of converted candidate solutions based on the plurality of candidate solutions and the user utterance; and generating the scores conditioned on the plurality of converted candidate solutions.

In some embodiments, the plurality of candidate solutions include chain-of-thought (CoT) solutions; and the plurality of converted candidate solutions include program-of-thought (PoT) counterparts of the plurality of CoT solutions.

In some embodiments, the method further includes filtering out one or more of the PoT counterparts in response to the one or more PoT counterparts failing to match the corresponding CoT solutions. In some embodiments, the plurality of candidate solutions comprise program-of-thought (PoT) solutions; and the plurality of converted candidate solutions comprise text descriptions of the plurality of candidate solutions concatenated with a respective one of the plurality of candidate solutions.

At step 612, the plurality of candidate solutions are ranked, using the AI agent, based on the scores.

At step 614, a response to the user utterance is generated, using the AI agent, based at least in part on one or more of the ranked plurality of candidate solutions.

In some embodiments, method 600 further includes outputting, via the communication interface, an alert message about a detected network anomaly. In some embodiments, the user utterance comprises a command to isolate the network anomaly, and the method further includes blocking incoming data packets to the server and outgoing data packets from the server.

In one embodiment, method 600 is applicable in a variety of applications. For example, the task request received by a neural network model (e.g., Mistral-7B) may relate to a diagnostic request in view of a medical record in a healthcare system, a curriculum designing request in an online education system, a code generation request in a software development system, a writing and/or editing request in a content generation system, an IT diagnostic request in an IT customer service support system, a navigation request in a robotic and autonomous system, and/or the like. By performing method 600, the neural network based artificial agent may improve technology in the respective technical field in healthcare and diagnostics, education and personalized learning, software development and code assistance, content creation, autonomous system (such as autonomous driving, etc.), and/or the like.

For example, when the task query includes a query to identify an information technology (IT) anomaly relating to a usage of an IT component such as a network gateway, a router, an online printer, and/or the like, by performing method 600 at an environment of a local area network (LAN), the neural network based artificial agent may receive an observation (e.g., system log, network traffic pattern, firewall records, and/or the like) from the environment at which the next-step action is executed, and determine that the observation representing an information technology anomaly (e.g., a router failure, an unauthorized access attempt, a domain name system anomaly, and/or the like). In some implementations, the neural network based artificial agent may cause an alert relating to the information technology anomaly to be displayed at a visualized user interface. In some implementations, the CoT model may generate a reason to be included in the alert providing an explanation on how an IT anomaly is identified.

In some embodiments, the neural network based artificial agent may be implemented at a network gateway, and/or send a message to the network gateway to cause a network entity identified with the anomaly to be isolated. For example, the network gateway may block any data packets originating from and destined for the network entity. For example, the alert with the explanation on how the IT anomaly is identified may be presented for review with a user, and the user may subsequently submit a user input to initiate the isolation of IT anomaly.

In this way, IT anomalies may be detected and alerted using the neural network based artificial agent in an efficient manner so as to improve network support technology.

Example Results

FIGS. 7A-7F represent exemplary test results using embodiments described herein.

Figure 7A:
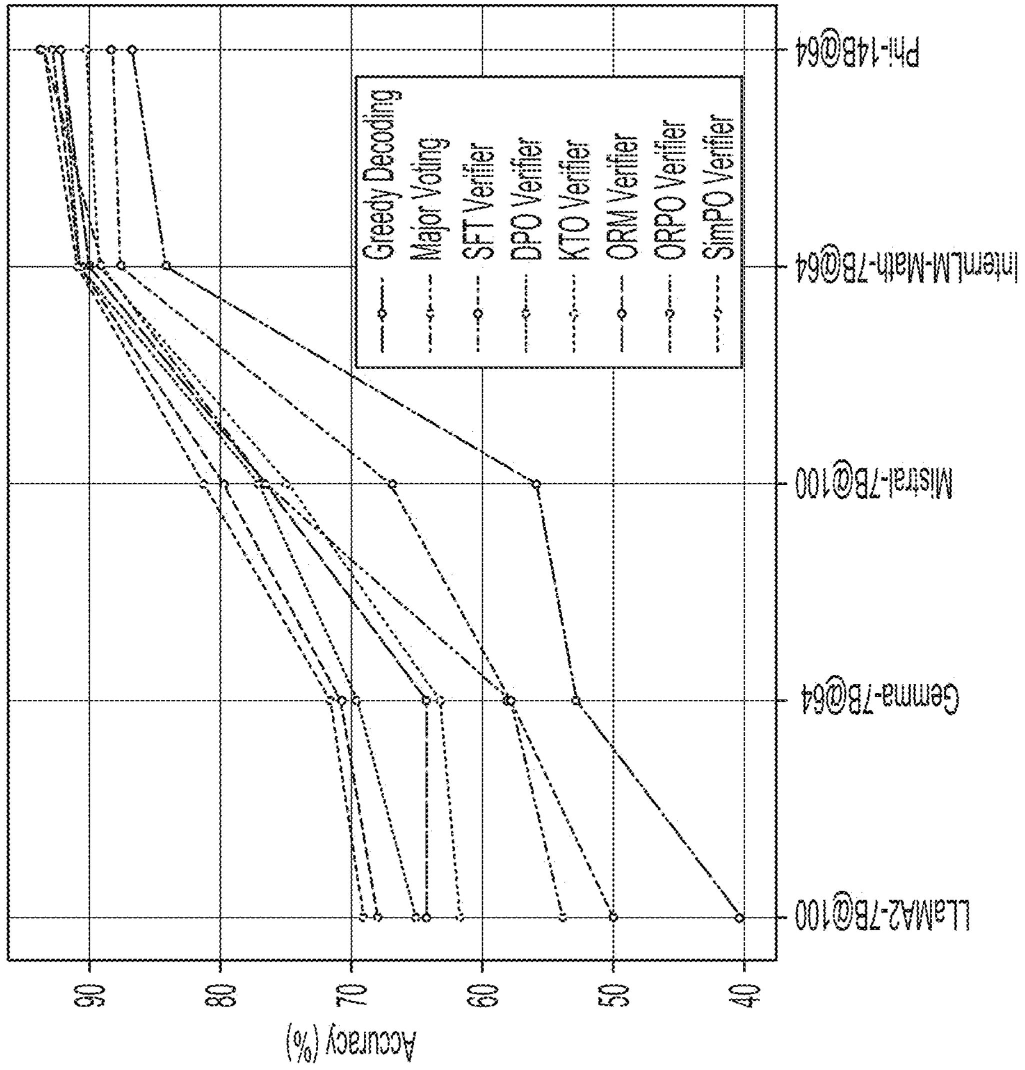

For all experiments in FIG. 7A, the latest Mistral-7B-instruct-v0.3 is used as the backbone LLM for building the verifiers and apply LoRA with a dropout rate of 0.1 to reduce the computational load during verifier training. The training batch size is set to 64, and the learning rate to 0.00002 for all verifiers. For ORM, an additional computational head is added on the per-token logits from the backbone LLM, outputting a scalar value for each token. The score of the last token is taken as the final score, which has shown better performance than averaging them based on our observations. For DPO and its variants, preference pairs are constructed by randomly selecting correct-incorrect solutions for the same problem from the training set. 8 A100-40G GPUs are used for all the experiments and employ vLLM to optimize the inference speed. The training of the verifiers takes 5 hours approximately. Supervised fine-tuning is first performed on all correct solutions and then apply preference loss on the preference set.

To evaluate the reasoning performance on the GSM8k dataset, LLAMA2-7B-base and Mistral-7B-v0.1 are used, both fine-tuned on GSM8k, along with Gemma-7B-it, Phi-14B, InternLM2-Math-7B, and LLAMA3-70B as our reasoners. For LLaMA2 and Mistral, 100 solutions per problem are sampled for voting and verification, while 64 solutions are generated for the rest. On the MATH dataset, which contains much harder problems than GSM8k, LLAMA2-7B-base and Mistral-7B-v0.1 are replaced with LLAMA3-8B-instruct and Mistral-7B-v0.3 for their superior reasoning ability, along with other four reasoners. For all problems in MATH500, 64 solutions are generated individually. All LLM output sampling in our paper is based on a temperature of 0.8 and top-p of 0.95.

The results are shown in FIG. 7A. It is observed that the verifiers consistently improve the greedy decoding baseline, especially for weaker reasoners such as LLAMA2-7B. In-distribution (ID) LLMs are also evaluated, which are the source LLMs used to generate the training data for verifiers, such as Mistral, InternLM2-Math, and Phi, and out-of-distribution (OOD) LLMs, such as LLAMA2-7B and Gemma-7B. The results show no significant difference between ID and OOD performance improvement by verifiers, suggesting that the disclosed approach can extend to any LLM reasoners and is not limited to the LLMs that generate the training data. Furthermore, preference-tuning-based verifiers, including DPO and SimPO, outperform ORM, similar to the findings in Hosseini et al. (Arian Hosseini, Xingdi Yuan, Nikolay Malkin, Aaron Courville, Alessandro Sordoni, and Rishabh Agarwal. V-star: Training verifiers for self-taught reasoners. *arXiv preprint arXiv:*2402.06457, 2024). The potential reason is that DPO and SimPO train LLMs without changing their structure, thus aligning better with their previous training goals of auto-regressive text generation. Additionally, ORPO and SimPO consistently out-perform DPO, potentially because the regularization term on the reference model in the DPO loss might negatively impact verifier training. In other words, the divergence of the SFT model and the final verifier is not needed to control because it will not be used for text generation anymore. Therefore, it can be concluded that the reference-free method is more suitable for verifier training.

Additionally, preference-tuning methods such as DPO and SimPO theoretically enable auto-regressive LLMs to generate solutions. However, it is observed that the generation ability of verifiers trained with preference pairs degrades rapidly, rendering them incapable of generating coherent sentences. This observation is also consistent with the findings in Hosseini et al. (Arian Hosseini, Xingdi Yuan, Nikolay Malkin, Aaron Courville, Alessandro Sordoni, and Rishabh Agarwal. V-star: Training verifiers for self-taught reasoners. *arXiv preprint arXiv:*2402.06457, 2024). This degradation is attributed to that the verifier training process involves more steps and larger learning rates than typical alignment practices, which likely causes the verifier's weights to diverge significantly from the fine-tuned checkpoint. Consequently, these verifiers lose their generation capability and are instead better suited for calculating the likelihood of pre-generated solutions.

This section focuses on evaluating the inference performance using the trained verifiers with the designed CoTnPoT filtering. The backbone model of the verifier is upgraded in math reasoning from Mistral-7B to MAmmoTH-7B-plus to enhance performance.

Regarding math reasoning, the inference process is further enhanced by combining majority voting with verifier scores, using the scores from verifiers as weights in the voting process. Specifically, Gumbel Softmax (Eric Jang, Shixiang Gu, and Ben Poole. Categorical reparameterization with gumbel-softmax. In *International Conference on Learning Representations,* 2022.) is applied with the hyperparameter t to regulate the influence of verifier-based scores, as shown in equation 3.

$$y_i = \frac{\exp\left(\frac{\log(\pi_i)}{\tau}\right)}{\sum_{j=1}^{k}\exp\left(\frac{\log(\pi_j)}{\tau}\right)} \quad (3)$$

where $\pi_i$ represents the unnormalized log probabilities for the i-th solution. Theoretically, if t is set to an infinitely large value, the weighted voting will be equivalent to majority voting. If t is close to zero, the result will depend solely on the verifier scores. A grid search is performed on t values from the set {0.1, 0.5, 1, 5, 10} for GSM8k and MATH datasets separately, finding that 0.5 works best for GSM8k and 10 works best for MATH. This implies that for simpler problems like those in GSM8k, verifiers can be more heavily relied on, while for more complex datasets like MATH, the original model outputs should be weighted more significantly.

As shown in FIG. 7B, blue percentages indicate performance improvements over the baseline with-out CoTnPoT, and green percentages indicate improvements over greedy decoding. Generally, it is observed that the final column, Weighted Voting+CoTnPoT, consistently outperforms all baselines across all reasoners. CoTnPoT brings improvements to most backbone reasoners and both datasets, demonstrating its effectiveness in filtering incorrect solutions. Notably, CoTnPoT provides a substantial performance boost for weaker reasoners but is less impactful as the reasoners become stronger. This is reasonable because verifying and filtering solutions for strong LLMs is a more challenging task compared to for weaker ones.

Regarding Code Reasoning, in addition to using PoT to verify and filter CoT answers, leveraging CoT comments to improve code solution verification is also explored.

As shown in FIG. 7C, incorporating CoTnPoT comments into the verification process leads to significant improvements across all LLM reasoners. It is believed that the generated comments enrich the information within the solution, enhancing the verifier's understanding of the solution. An ablation study was conducted on the additional training set, i.e., MagiCoder-75k. The experiments show that MagiCoder-75k serves as a valuable additional training resource for coding benchmarks like MBPP. Moreover, it is observed that greedy decoding is already a strong baseline for coding tasks, and the disclosed verifier-based approaches usually fall short, likely due to the abstractness and obscureness of codes. That is also the reason why the proposed CoTnPoT-based strategy is effective, i.e., high-granularity explanations are provided to clarify the solutions.

The disclosed math verifier, Math-Rev, is compared with two recent baselines, Math-Shepard and Math-Minos. Their methodology is followed and a consistent LLM reasoner, MetaMath-7B-Mistral, is used. Although there is a slight difference in the 64 solutions per problem sampled in this disclosure whereas the 256 solutions sampled by them, the disclosed verifier Math-Rev still achieves the best performance, as shown in FIG. 7D. This success is attributed to the more effective verifier training method, SimPO, and the pairwise training data sampled from multiple LLM reasoners. Another notable finding is that the disclosed CoTnPoT method poses a slightly negative impact on the MATH500 dataset, the reason is that CoTnPoT is less helpful on stronger backbone reasoners, as also shown in FIG. 7B. However, it does not hinder its general applicability demonstrated in FIG. 7B and still has the potential to improve by switching the coder model that translates CoT to PoT to stronger ones.

Our Math-Rev is paired with one of the strongest open models, Qwen-72B-Instruct. As found out in this disclosure, the final performance of Qwen-72B+Math-Rev on MATH surpasses all SOTA baselines including GPT-4o. This experiment demonstrates that Math-Rev can enhance even the most powerful LLM reasoners, despite being trained on data from smaller and weaker models, highlighting the promising effectiveness of verification—learning from errors.

The proposed CoTnPoT is compared with two ablated approaches: A1. Prompting the same coder LLM to generate the final answer directly through code, and filtering out CoT solutions that do not match the code solution. This ablation isolates the scenario where the coder LLM relies solely on its inherent strong math problem-solving ability, instead of analyzing and transforming the CoT solution. A2. Prompting the same coder LLM to generate comments that analyze the CoT solutions and assess their correctness. This approach intuitively leverages LLMs as filters for verification.

Figure 7E:
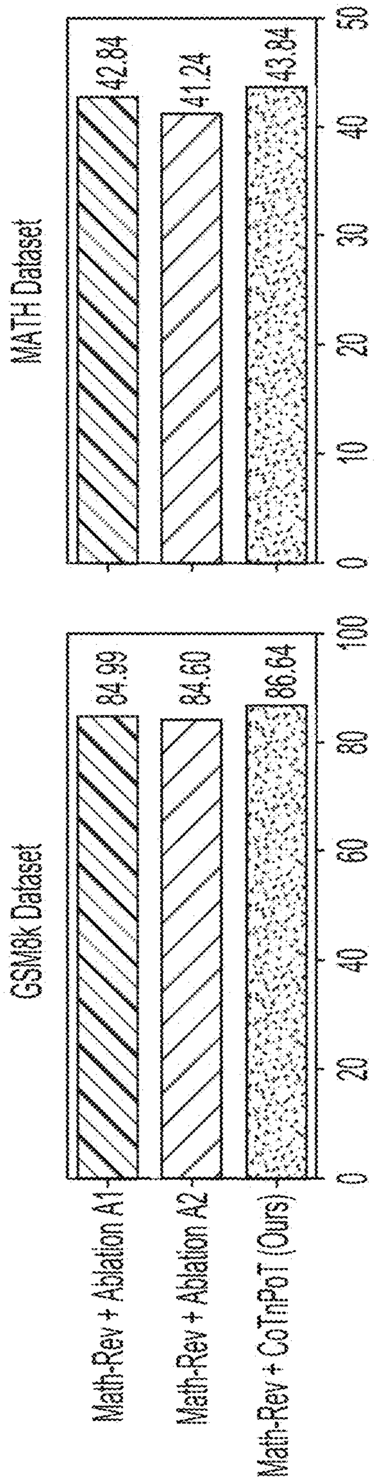

CoTnPoT, A1, and A2 are implemented and compared across all settings and both datasets in FIG. 7E. The accuracy is averaged at the dataset level for better visibility. It is observed that CoTnPoT consistently outperforms both A1 and A2. The potential reason is that the task of translating CoT solutions to PoT solutions is easier and requires less reasoning than the processes in A1 and A2. Therefore, although A1 and A2 are more direct methods to verify a solution, their performance is limited by the capability of the coder LLM. On the other hand, CoTnPoT relies less on complex reasoning, making it more effective overall.

The disclosed method, CoTnPoT, for math reasoning is designed to filter out low-quality solutions by examining the match between CoT and PoT solutions. This approach essentially functions as a binary classification task. By defining the ground truth label of a correct CoT solution as 1 and an incorrect CoT solution as 0, the correspondence between CoT and PoT solutions is used as the prediction label, where a match is labeled as 1 and a mismatch as 0. The effectiveness of the CoTnPoT filter is directly correlated to the performance of this binary classifier, aiming to retain all solutions labeled as 1 and discard those labeled as 0.

To validate this method, 50,000 correct and 50,000 incorrect CoT solutions are randomly selected from the verifier training set and applied the CoTnPoT filter. The performance of the classifier is summarized in the confusion matrix presented in FIG. 7F. The results demonstrate that the CoTnPoT classifier effectively identifies correct solutions, as evidenced by high True Positive Rate (TPR) and False Negative Rate (FNR). While the False Positive Rate (FPR) and True Negative Rate (TNR) are moderate, indicating some incorrect solutions are not filtered out, the majority of correct solutions are preserved for further verification. This experiment provides strong evidence of the significant performance improvement that the CoTnPoT-based filter brings to math reasoning.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for building an artificial intelligence (AI) agent to respond to a user utterance requesting for support, comprising:

receiving, via a communication interface, a training query requesting for support in natural language;

generating, by a first neural network based language model, a training dataset comprising a correct solution and an incorrect solution to the training query requesting for support in response to an input prompt combining the training query requesting for support and an instruction that causes the first neural network based language model to generate the correct solution and the incorrect solution;

generating, by a second neural network based language model, a first candidate score in response to the correct solution and a second candidate score in response to the incorrect solution;

training, the second neural network based language model, based on a training objective comparing the first candidate score and the second candidate score;

building, at a server, an AI agent through a first application programming interface (API) to a third neural network based language model, wherein the third neural network based language model generates a plurality of candidate solutions in response to the user utterance requesting for support, through a second API to the trained second neural network based language model, wherein the trained second neural network based language model generates scores conditioned on the plurality of candidate solutions, and through a third API to a fourth neural network based language model, wherein the fourth neural network based language model generates a plurality of converted candidate solutions based on the plurality of candidate solutions and the user utterance requesting for support;

generating the scores conditioned on the plurality of converted candidate solutions;

ranking, using the AI agent, the plurality of candidate solutions based on the scores; and generating, using the AI agent, an output solution to the user utterance requesting for support based at least in part on one or more of the ranked plurality of candidate solutions.

2. The method of claim 1, wherein:

the training query includes a math question, and the correct solution and the incorrect solution include math solutions; or the training query includes a code question, and the correct solution and the incorrect solution include code solutions.

3. The method of claim 2, wherein:

the math solutions include chain-of-thought (CoT) solutions; and the code solutions include program-of-thought (PoT) solutions.

4. The method of claim 1, wherein:

the plurality of candidate solutions comprise chain-of-thought (CoT) solutions; and the plurality of converted candidate solutions comprise program-of-thought (PoT) counterparts of the plurality of CoT solutions.

5. The method of claim 4, further comprising filtering out one or more of the POT counterparts in response to the one or more PoT counterparts failing to match the corresponding CoT solutions.

6. The method of claim 1, wherein:

the plurality of candidate solutions comprise program-of-thought (PoT) solutions; and the plurality of converted candidate solutions comprise text descriptions of the plurality of candidate solutions concatenated with a respective one of the plurality of candidate solutions.

7. The method of claim 1, further comprising outputting, via the communication interface, an alert message about a detected network anomaly, wherein the user utterance comprises a command to isolate the network anomaly, and the method further includes blocking incoming data packets to the server and outgoing data packets from the server.

8. A system for building an artificial intelligence (AI) agent to respond to a user utterance requesting for support, the system comprising:

a memory that stores a first neural network based language model, a second neural network based language model, a third neural network based language model, and a plurality of processor executable instructions;

a communication interface that receives a training query requesting for support in natural language; and one or more hardware processors that read and execute the plurality of processor-executable instructions from the memory to perform operations comprising:

generating, by the first neural network based language model, a training dataset comprising a correct solution and an incorrect solution to the training query requesting for support in response to an input prompt combining the training query requesting for support and an instruction that causes the first neural network based language model to generate the correct solution and the incorrect solution;

generating, by the second neural network based language model, a first candidate score in response to the correct solution and a second candidate score in response to the incorrect solution;

training, the second neural network based language model, based on a training objective comparing the first candidate score and the second candidate score;

building, at a server, an AI agent through a first application programming interface (API) to the third neural network based language model, wherein the third neural network based language model generates a plurality of candidate solutions in response to the user utterance requesting for support, through a second API to the trained second neural network based language model, wherein the trained second neural network based language model generates scores conditioned on the plurality of candidate solutions, and through a third API to a fourth neural network based language model, wherein the fourth neural network based language model generates a plurality of converted candidate solutions based on the plurality of candidate solutions and the user utterance requesting for support;

generating the scores conditioned on the plurality of converted candidate solutions;

ranking, using the AI agent, the plurality of candidate solutions based on the scores; and generating, using the AI agent, an output solution to the user utterance requesting for support based at least in part on one or more of the ranked plurality of candidate solutions.

9. The system of claim 8, wherein:

the training query includes a math question, and the correct solution and the incorrect solution include math solutions; or the training query includes a code question, and the correct solution and the incorrect solution include code solutions.

10. The system of claim 9, wherein:

the math solutions include chain-of-thought (CoT) solutions; and the code solutions include program-of-thought (Pol) solutions.

11. The system of claim 8, wherein:

the plurality of candidate solutions comprise chain-of-thought (CoT) solutions; and the plurality of converted candidate solutions comprise program-of-thought (PoT) counterparts of the plurality of CoT solutions.

12. The system of claim 11, wherein the operations further include filtering out one or more of the POT counterparts in response to the one or more POT counterparts failing to match the corresponding CoT solutions.

13. The system of claim 8, wherein:

the plurality of candidate solutions comprise program-of-thought (PoT) solutions; and the plurality of converted candidate solutions comprise text descriptions of the plurality of candidate solutions concatenated with a respective one of the plurality of candidate solutions.

14. The system of claim 8, wherein the operations further include outputting, via the communication interface, an alert message about a detected network anomaly, wherein the user utterance comprises a command to isolate the network anomaly, and the operations further include blocking incoming data packets to the server and outgoing data packets from the server.

15. A non-transitory machine-readable medium comprising a plurality of machine-executable instructions which, when executed by one or more processors, are adapted to cause the one or more processors to perform operations comprising:

receiving, via a communication interface, a training query requesting for support in natural language;

generating, by a first neural network based language model, a training dataset comprising a correct solution and an incorrect solution to the training query requesting for support in response to an input prompt combining the training query requesting for support and an instruction that causes the first neural network based language model to generate the correct solution and the incorrect solution;

generating, by a second neural network based language model, a first candidate score in response to the correct solution and a second candidate score in response to the incorrect solution;

training, the second neural network based language model, based on a training objective comparing the first candidate score and the second candidate score;

building, at a server, an AI agent through a first application programming interface (API) to a third neural network based language model, wherein the third neural network based language model generates a plurality of candidate solutions in response to a user utterance requesting for support, through a second API to the trained second neural network based language model, wherein the trained second neural network based language model generates scores conditioned on the plurality of candidate solutions, and through a third API to a fourth neural network based language model, wherein the fourth neural network based language model generates a plurality of converted candidate solutions based on the plurality of candidate solutions and the user utterance requesting for support;

ranking, using the AI agent, the plurality of candidate solutions based on the scores; and generating, using the AI agent, an output solution to the user utterance requesting for support based at least in part on one or more of the ranked plurality of candidate solutions.

16. The non-transitory machine-readable medium of claim 15, wherein:

the training query includes a math question, and the correct solution and the incorrect solution include math solutions; or the training query includes a code question, and the correct solution and the incorrect solution include code solutions.

17. The non-transitory machine-readable medium of claim 16, wherein:

the math solutions include chain-of-thought (CoT) solutions; and the code solutions include program-of-thought (PoT) solutions.

18. The non-transitory machine-readable medium of claim 15, wherein:

the plurality of candidate solutions comprise chain-of-thought (CoT) solutions; and the plurality of converted candidate solutions comprise program-of-thought (PoT) counterparts of the plurality of CoT solutions.

19. The non-transitory machine-readable medium of claim 17, wherein the operations further include filtering out one or more of the POT counterparts in response to the one or more PoT counterparts failing to match the corresponding CoT solutions.

20. The non-transitory machine-readable medium of claim 15, wherein:

the plurality of candidate solutions comprise program-of-thought (PoT) solutions; and the plurality of converted candidate solutions comprise text descriptions of the plurality of candidate solutions concatenated with a respective one of the plurality of candidate solutions.

* * * * *